(12) United States Patent
Dhanuka et al.

(10) Patent No.: US 11,600,030 B2
(45) Date of Patent: Mar. 7, 2023

(54) TRANSFORMING DIGITAL DESIGN OBJECTS UTILIZING DYNAMIC MAGNETIC GUIDES

(71) Applicant: Adobe Inc., San Jose, CA (US)

(72) Inventors: Praveen Kumar Dhanuka, Howrah (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 30 days.

(21) Appl. No.: 16/938,645

(22) Filed: Jul. 24, 2020

(65) Prior Publication Data

US 2022/0028140 A1    Jan. 27, 2022

(51) Int. Cl.
*G06T 11/60*    (2006.01)
*G06T 3/40*    (2006.01)
(Continued)

(52) U.S. Cl.
CPC ............. *G06T 11/60* (2013.01); *G06T 3/20* (2013.01); *G06T 3/40* (2013.01); *G06T 3/60* (2013.01); *G06T 7/60* (2013.01); *G06T 2200/24* (2013.01); *G06T 2207/30176* (2013.01); *G06T 2210/21* (2013.01)

(58) Field of Classification Search
CPC ... G06T 11/60; G06T 3/20; G06T 3/40; G06T 2200/24; G06T 3/60; G06T 7/60; G06T 2210/21; G06T 2207/30176
See application file for complete search history.

(56) References Cited

U.S. PATENT DOCUMENTS

| 6,065,021 A | * | 5/2000 | George | G06F 40/103 700/192 |
| 6,377,240 B1 | * | 4/2002 | Baudel | G06T 11/20 345/157 |

(Continued)

OTHER PUBLICATIONS

Marianela Ciolfi Felice, Nolwenn Maudet, Wendy E. Mackay, and Michel Beaudouin-Lafon. Beyond snapping: Persistent, tweakable alignment and distribution with stickylines. In Proceedings of the 29th Annual Symposium on User Interface Software and Technology, UIST '16, p. 133-144, New York, NY, USA, 2016. Association for Computing Machinery.

(Continued)

*Primary Examiner* — Phi Hoang
(74) *Attorney, Agent, or Firm* — Keller Preece PLLC

(57) ABSTRACT

The present disclosure relates to systems, non-transitory computer-readable media, and methods for utilizing visual constraint guides to automatically transform digital design objects within a digital document based on transformation of intersecting visual constraint guides. In particular, in one or more embodiments, the disclosed systems generate visual constraint guides and identifies digital design objects intersecting the visual constraint guides. Further, the disclosed systems can receive user input transforming the visual constraint guide. In response, the disclosed systems can transform both the visual constraint guide and associated digital design objects based on the received transformation. More specifically, the design guide system can transform the digital design objects relative to the visual constraint guide while maintaining distribution and alignment constraints of the digital design objects relative to the visual constraint guide.

20 Claims, 16 Drawing Sheets

(51) Int. Cl.
    *G06T 3/60* (2006.01)
    *G06T 7/60* (2017.01)
    *G06T 3/20* (2006.01)

(56) References Cited

U.S. PATENT DOCUMENTS

| | | | | |
|---|---|---|---|---|
| 6,417,865 | B1* | 7/2002 | Bou | G06F 3/0481 |
| | | | | 345/473 |
| 6,469,709 | B1* | 10/2002 | Sakai | G06T 3/00 |
| | | | | 345/619 |
| 6,568,938 | B1* | 5/2003 | Prince | G09B 11/04 |
| | | | | 434/90 |
| 2010/0020101 | A1* | 1/2010 | Schormann | G06T 11/206 |
| | | | | 345/650 |
| 2013/0014008 | A1* | 1/2013 | Damera-Venkata | |
| | | | | G06F 40/106 |
| | | | | 715/252 |
| 2013/0268854 | A1* | 10/2013 | Altin | G06T 11/60 |
| | | | | 715/708 |
| 2016/0092080 | A1* | 3/2016 | Swanson | G06F 3/04883 |
| | | | | 345/654 |
| 2020/0326829 | A1* | 10/2020 | Hu | G06F 3/04883 |

OTHER PUBLICATIONS

Wikipedia contributors. Procrustes analysis—Wikipedia, the free encyclopedia, 2019.

* cited by examiner

TRANSFORMING DIGITAL DESIGN OBJECTS UTILIZING DYNAMIC MAGNETIC GUIDES

BACKGROUND

Recent years have seen significant development in hardware and software platforms that utilize digital tools to generate and manipulate design objects within digital design spaces. For example, conventional content management systems can create complex design shapes and then transform these shapes within a design space to generate enhanced digital images. More specifically, conventional content management systems can monitor user interaction with each digital object and transform digital objects individually based on the received user input. Although conventional systems provide tools for creating and modifying design objects, such systems have a number of technical shortcomings, particularly with regard to accuracy, efficiency, and flexibility of operation.

BRIEF SUMMARY

Embodiments of the present disclosure provide benefits and/or solve one or more of the foregoing or other problems in the art with systems, non-transitory computer-readable media, and methods for utilizing visual constraint guides to efficiently, accurately, and flexibly transform sets of digital design objects within a digital document. In particular, the disclosed systems can utilize a specialized vector geometry (called a visual constraint guide or magnetic guide) to define and efficiently modify design constraints across multiple objects through minimal user inputs. For example, the disclosed systems can generate visual constraint guides in the form of a variety of complex vector shapes, including non-linear, non-circular shapes custom-generated for particular design arrangements within a digital document. To illustrate, the disclosed systems can automatically generate a persistent visual constraint guide that intersects a set of selected digital design objects in need of transformation.

Based on user interaction with the visual constraint guide, the disclosed systems can transform both the visual constraint guide and the digital design objects intersecting the visual constraint guide. In particular, the disclosed systems can perform a variety of complex transformations, including relative rotation, scaling, and shape modification, that modify both the visual constraint guide and the set of digital design objects intersecting the visual constraint guide. The disclosed systems can perform these transformations while maintaining relative distribution and alignment design constraints between the digital design objects and the visual constraint guide. Further, in some embodiments, the disclosed systems can generate a hierarchical relationship of multiple visual constraint guides and transform multiple visual constraint guides and multiple sets of intersecting design objects. For example, the disclosed systems can identify similar visual constraint guides and transform the visual constraint guides based on similar constraints defined across different sets of objects. In this manner, the disclosed systems can improve the efficiency and functionality of implementing devices in modifying digital design objects.

BRIEF DESCRIPTION OF THE DRAWINGS

The detailed description describes one or more embodiments with additional specificity and detail through the use of the accompanying drawings, as briefly described below.

DETAILED DESCRIPTION

Figure 1:
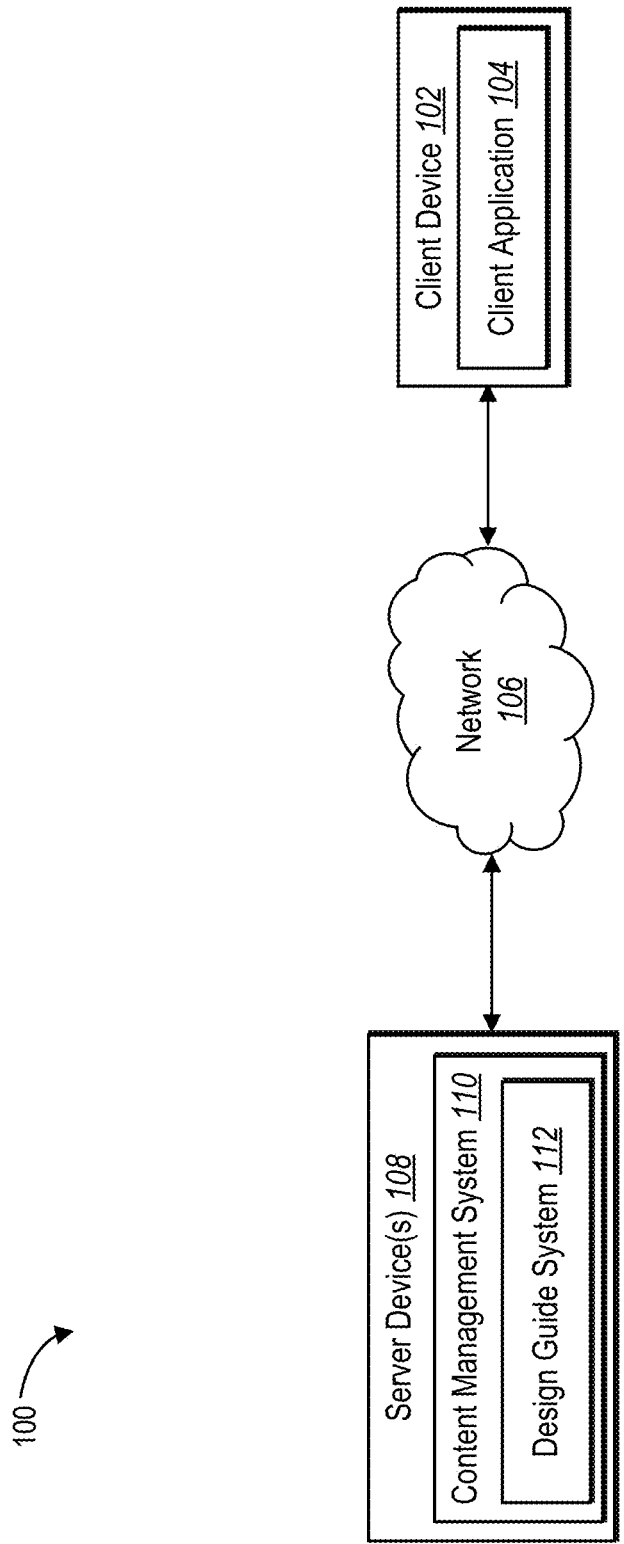
FIG. 1 illustrates a diagram of a system environment in which a design guide system can operate in accordance with one or more embodiments.

This disclosure describes one or more embodiments of a design guide system that efficiently, accurately, and flexibly transforms digital design objects within digital design documents utilizing editable, free-form, and persistent visual constraint guides. In particular, the design guide system can utilize visual constraint guides (sometimes referred to as magnetic guides) to transform digital design objects while maintaining design constraints for alignment and distribution relative to the visual constraint guides. For example, in one or more embodiments, the design guide system automatically generates visual constraint guides by creating a complex (e.g., non-linear, non-circular) vector geometry that intersects a set of digital design objects. Further, the design guide system can perform a variety of complex transformations (e.g., relative scaling, rotation, or shape modification) on the set of digital design objects based on a user interaction with the visual constraint guide. Specifically, the design guide system can identify user interaction with the visual constraint guide, apply a transformation to the visual constraint guide based on the user interaction, and transform the intersecting digital design objects to maintain alignment and distribution design constraints relative to the modified visual constraint guide.

Moreover, in some embodiments, the design guide system can utilize hierarchical visual constraint guides to define more complex visual relationships and constraints among digital design objects. For example, the design guide system can determine multiple intersecting visual constraint guides, where each visual constraint guide has a corresponding set of intersecting digital design objects. Based on user interaction with a single visual constraint guide, the design guide system can efficiently propagate complex transformations across different visual constraint guides and corresponding sets of intersecting digital design objects with minimal user inputs.

As just mentioned, in one or more embodiments, the design guide system generates visual constraint guides. In particular, the design guide system can generate a visual constraint guide comprising a persistent complex vector geometry that can be used to define relative design constraints across intersecting digital design objects. The design guide system can generate visual constraint guides utilizing a variety of approaches. In one or more embodiments, the design guide system generates visual constraint guides based on user input of a vector geometry. For instance, the design guide system can generate a visual constraint guide based on a user drawing a vector having a particular size and shape.

In addition, as mentioned above, in some embodiments the design guide system automatically generates visual constraint guides for a particular set of digital design objects. To illustrate, the design guide system can receive user selection of a set of digital design objects. The design guide system can automatically generate an efficient visual constraint guide that intersects the set of digital design objects and defines relative constraints between the digital design objects. For example, as outlined in greater detail below the design guide system can generate a visual constraint guide for a set of digital design objects utilizing a cost-based approach that analyzes deflection angles and geometric distances among the set of selected digital design objects.

Further, in some embodiments the design guide system automatically adds a digital design object to a visual constraint guide based on detecting a new intersection between the digital design object and the visual constraint guide. For example, the design guide system can detect movement of a digital design object to a position that intersects the visual constraint guide or detect movement of a visual constraint guide to intersect a digital design object. In response, the design guide system can automatically add the digital design object to a set of intersecting digital design objects to transform in conjunction with the visual constraint guide.

As discussed briefly above, the design guide system can detect user interaction with visual constraint guides and apply transformations to both the visual constraint guides and a set of digital design objects intersecting the visual constraint guide. More specifically, the design guide system can detect an initial distribution or alignment constraint between the digital design objects and the visual constraint guide. The design guide system can apply the transformation to the digital design objects while maintaining the alignment and distribution of the digital design objects relative to the visual constraint guide. Accordingly, the design guide system can maintain visual constraints among the digital design objects and the attached visual constraint guide while efficiently transforming the digital design objects and the visual constraint guide.

For example, the design guide system can apply a rotation to a visual constraint guide and associated digital design objects. More specifically, the design guide system can identify a hinge point for the visual constraint guide (based on user input with the visual constraint guide). Further, in some embodiments, the visual constraint guide rotates the digital design objects around the hinge point corresponding to the visual constraint guide. That is, the design guide system can rotate the visual constraint guide and a set of intersecting digital design objects while maintaining the alignment of the digital design objects relative to the visual constraint guide.

In one or more embodiments, the design guide system also applies transformations of digital design objects by scaling the visual constraint guide. For example, the design guide system can identify a distribution of the digital design objects relative to the visual constraint guide and receive user input reflecting a scaling of the visual constraint guide. In response, the design guide system can then modify positions of the digital design objects to maintain the distribution of the digital design objects relative to the visual constraint guide.

In addition, the design guide system can apply transformations by modifying the shape of the visual constraint guide. For example, the design guide system can receive user interaction modifying a curve of a geometry vector defining the visual constraint guide. In response, the design guide system can modify positions and rotations of intersecting digital design objects along the visual constraint guide while maintaining the alignment and distribution of the digital design objects relative to the new shape of the visual constraint guide.

The design guide system can also modify design constraints through minimal user interactions with the visual constraint guide and/or the digital design objects. For example, the design guide system can independently modify the relative position, distribution, or orientation of digital design objects and/or the visual constraint guide. For example, the design guide system can move a digital design object to a different position along the visual constraint guide to establish a modified relative position/distribution of the digital design object along the visual constraint guide. The design guide system can then apply transformations using this modified relative position/distribution.

Additionally, as mentioned above, the design guide system can identify hierarchical associations between visual constraint guides and can transform digital design objects utilizing these associations. For example, the design guide system can identify two intersecting visual constraint guides. Based on a transformation received at a first visual constraint guide, the design guide system can apply the transformation to the second intersecting visual constraint guide (and corresponding digital design objects). Thus, the design guide system can apply transformational momentum from one visual constraint guides to subsequent visual constraint guides to efficiently transform digital design objects.

In some embodiments, the design guide system can automatically identify, associate, and modify similar visual constraint guides. For example, the design guide system can identify visual constraint guide similar in size, shape, and/or arrangement. In one or more embodiments, the design guide system 112 utilizes a Procrustes analysis to identify similar visual constraint guides. In some embodiments, the design guide system implements transformations from one visual constraint guides to a set of similar visual constraint guides. Thus, the design guide system can automatically implement transformations across visual constraint guides and different sets of intersecting digital design objects based on minimal interaction with a first visual constraint guide.

As suggested above, conventional content management systems exhibit a number of technical deficiencies with regard to efficiency, accuracy, and flexibility. For example, many conventional content management systems inefficiently manage digital design objects (individually or through inefficient design selection tools). To illustrate, many conventional content management systems require user interaction selecting each individual digital design object together with additional user interactions to modify and/or move each digital design objects. For example, to re-distribute a set of digital design objects across a page, conventional systems require repetitive user interaction to iteratively select each digital design object and move each digital design object to a desired location. Accordingly, conventional systems requires excessive user interactions, time, and computing resources to implement modifications across a variety of digital design objects.

Further, the approach utilized by conventional systems also undermines accuracy of implementing computing systems. Indeed, by relying on repeated individual selection of digital design objects, conventional content management systems can cause inaccurate modifications in transforming digital design objects. To illustrate, in re-distributing a set of digital design objects across a page, relying on user selection of new positions for each digital design object will often result in an inaccurate or uneven distribution of digital design objects. Accordingly, conventional systems can undermine precision and accuracy in positioning the digital design objects.

Conventional content management systems also lack flexibility. As mentioned, conventional content management are limited to a rigid set of simple modifications. For example, many systems are limited to tools for moving digital design objects at the same time. However, this limited movement functionality fails to accommodate the wide array of transformations utilized in digital design. Further, as mentioned above, movement of design objects (individually or as a group) oftentimes undermines visual synergy (e.g., distribution or alignment) of digital design objects.

The design guide system provides many advantages and benefits over conventional systems and methods. For example, by generating and utilizing visual constraint guides, the design guide system improves efficiency relative to conventional systems. Specifically, the design guide system can perform a variety of transformations to a large number of digital design objects through a minimal number of user interactions with a visual constraint guide. Indeed, upon generating a visual constraint guide, the design guide system can move, scale, rotate, or modify the relative shape of a set of digital design objects through a single user interaction with a visual constraint guide. Thus, the design guide system provides an efficient approach to transforming a variety of digital design objects that reduces user interactions and corresponding computer resources.

Further, the design guide system can improve accuracy relative to conventional content management systems. Indeed, as discussed above, the design guide system can determine and utilize visual-spatial relationships between digital design objects and visual constraint guides to transform digital design objects while maintaining visual constraints with precision and accuracy. For example, the design guide system can utilize distribution and alignment constraints between digital design objects and visual constraint guides to transform digital design objects to new positions that accurately and precisely reflect the initial spatial relationship with the visual design guide. To illustrate, the design guide system can re-distribute, rotate, or shift the underlying relationship shape between digital design objects while maintaining the visual synergy (e.g., spacing and alignment) between the digital design objects within a digital document relative to the underlying transformation.

The design guide system also improves flexibility relative to conventional content management systems. To illustrate, by utilizing visual constraint guides, the design guide system can implement a variety of transformations to digital design objects relative to a corresponding visual constraint guide, including scaling changes, rotational modifications, or shape modifications. Moreover, as discussed above, the design guide system can utilize intersections between visual constraint guides and/or similarities between visual constraint guides to apply transformations across various digital design objects. The design guide system can also generate visual constraint guides of irregular (e.g. non-linear, non-circular) shapes to efficiently modify digital design objects appearing in irregular configurations within a digital design document. Accordingly, the design guide system can provide improved functionality and flexibility to implementing computing systems in transforming digital design objects.

As indicated by the foregoing description, this disclosure utilizes a variety of terms to describes features and advantages of the design guide system. Additional detail is now provided regarding examples of these terms. For instance, a visual constraint guide can include a shape, geometry, or vector that is utilized to modify a set of (intersecting) digital design objects. More specifically, a visual constraint guide can include a persistent geometric vector (e.g., a vector within a digital document that remains within the digital design object after user interaction with other design elements within the digital document) that defines a set of digital design objects to modify. In some embodiments, the design guide system transforms digital design objects corresponding to a visual constraint guide based on user input received at the visual constraint guide. More specifically, the design guide system can transform digital design objects intersecting the visual constraint guide while maintaining visual constraints (e.g., alignment and/or distribution constraints) of the digital design objects relative to the visual constraint guide.

A visual constraint guide can include a variety of shapes and sizes, including a non-circular, non-linear shape (e.g., a shape that includes more than a single straight line or a single circle). To illustrate, a non-linear and non-circular geometric shape can include a variety of irregular shapes and/or combination of lines. For example, a non-linear and non-circular geometric shape can include an oval, a rectangle, a square, a parallelogram, a triangle, a wavy line, a zig-zag, a heart, and a variety of other irregular geometric shapes and/or lines.

Further, as mentioned above, the digital design system can modify digital design objects within a digital design document. A digital design document can include a digital file or digital design space for portraying/modifying digital media. In particular, a digital design document can include a digital file defining a digital media item or a digital design space (e.g., a user interface) for creating/displaying a digital media item. To illustrate, in utilizing a software application for generating a digital image comprising a variety of digital design objects, a digital document can include the file defining the digital image being designed (e.g., a PDS file) within the software application. A digital document can also include the digital design space (e.g., the user interface) utilized to create and/or display the digital image within the software application.

Relatedly, a digital design object can include a digital shape, digital graphic, digital text, digital vector, digital image or other digital visual object within a digital design document. To illustrate, a digital design object can include a movable and/or editable visual object within a digital design document. For example, in creating a digital design document that portrays a plurality of star shapes, each star shape would be a digital design object.

Additionally, a transformation refers to a modification of a visual constraint guide and/or digital design object. To illustrate, a transformation can include a change to the position, size, shape, scale, or orientation of a visual constraint guide and/or digital design. For example, applying a change in scale transformation to a visual constraint guide can result in applying a change in position transformation to digital design objects to maintain a distribution constraint relative to the visual constraint guide.

Additionally, as used in this disclosure, a cost metric can include a measure of a cost function corresponding to adding a connection between digital design objects. To illustrate, a cost metric can include a measure resulting from applying a cost function to a proposed connection between two digital design objects in automatically generating a visual constraint guide. In particular, a cost metric can include measure of cost determined as a function of deflection angle and geometric distance between digital design objects. Further, a deflection angle can include an angular measure between two lines (e.g., an angular measure between line segments connecting digital design objects). Similarly, a geometric distance can include a distance between two items (e.g., a length of a line segment connecting two digital design objects).

Also, a distribution (or distribution constraint) can include a relative positioning of one or more objects. In particular, a distribution can include a positioning of objects relative to a visual constraint guide. For example, a distribution can include distances between one or more objects relative to a size or length of a visual constraint guide. The design guide system can maintain the distribution while modifying the visual constraint guide by adjusting positions of the digital design objects (or the distances between digital design objects) proportionate to changes in the visual constraint guide. Thus, a distribution can include distances between digital design objects on a visual constraint guide relative to a length of the visual constraint guide.

Additionally, an alignment (or alignment constraint) can include a relative orientation of one or more objects. To illustrate, an alignment can include an orientation or rotation of digital design objects relative to a visual constraint guide. For example, an alignment can include an angle of intersection relative to a slope of a visual constraint guide. The design guide system 112 can maintain the alignment while modifying the visual constraint guide by adjusting the orientations of digital design objects proportionate to the changes to the visual constraint guide.

Further, a scaling factor can include a metric or measure representing a difference in scale. To illustrate, a scaling factor can include a metric representing a difference in size between an initial visual constraint guide and a transformed visual constraint guide. A scaling factor can also include a metric representing a difference between an initial position of a digital design object and a final position of a digital design object (e.g., relative to another digital design object, a visual constraint guide, or an initial object distribution).

For example, a scaling that doubles the size of a visual constraint guide can correspond to a scaling that doubles spacing between two intersecting digital design objects. In some embodiments, the design guide system can determine a scaling factor based on the location, direction, and length of a received user input transforming a visual constraint guide.

Relatedly, a scaling position change can include the movement of a digital design object along a visual constraint guide in response to scaling of the visual constraint guide. To illustrate, a scaling position change can include the movement of a digital design object to maintain alignment and/or distribution of digital design objects relative to a visual constraint guide after a scaling of the visual constraint guide.

Also, a geometric similarity model can include a computer-implemented algorithm that identifies a measure of likeness, similarity, or difference between two objects. To illustrate, a geometric similarity model can include a computer-implemented algorithm that identifies objects that represent affine transformations of a target object. Similarly, a geometric similarity model can include a computer-implemented algorithm that determines a measure of similarity based on shape, size, arrangement, orientation and/or other object characteristics. In one or more embodiments, a geometric similarity model includes a Procrustes analysis model. For example, the digital design system can utilize a geometric similarity model to identify two visual constraint guides and/or two digital design objects that satisfy a similarity threshold (e.g., a threshold similarity metric).

Additionally, a geometric center can include a central point of an object. To illustrate, a geometric center can include a point that is the centroid or arithmetic mean of points/pixels in an object (or an object boundary). For example, a geometric center can include a point that is the arithmetic mean of points in a visual constraint guide and/or a digital design object.

Further, a hinge point can include a pixel, position, or location around which a rotation pivots. To illustrate, a hinge point can include a position within a digital design document around which a visual constraint guide or a digital design object pivots in applying a rotation transformation Additional detail regarding the asset extraction system will now be provided with reference to the figures. For example, FIG. 1 illustrates a schematic diagram of an example system environment 100 (or "system 100") for implementing a design guide system 112 in accordance with one or more embodiments. Specifically, FIG. 1 illustrates the system 100 including a client device 102, a client application 104, a network 106, server device(s) 108, a content management system 110, and a design guide system 112. Although FIG. 1 illustrates one client device, in alternative embodiments, the system 100 can include any number of client devices and corresponding users. Similarly, although FIG. 1 illustrates a particular arrangement of the client device 102, the network 106, the server device(s) 108, and the third-party server(s), various arrangements are possible.

As shown in FIG. 1, the client device 102 can include the client application 104. As discussed below with regard to FIG. 12, the client device 102 can include a variety of types of computing devices. In some embodiments, the client application 104 includes one or more software applications that allow a corresponding user to view, manage, modify, edit, generate, send, and/or receive digital content. For example, the client application 104 can be a software application installed on the client device 102 or a web-based application accessed via the server device(s) 108.

Figure 12:
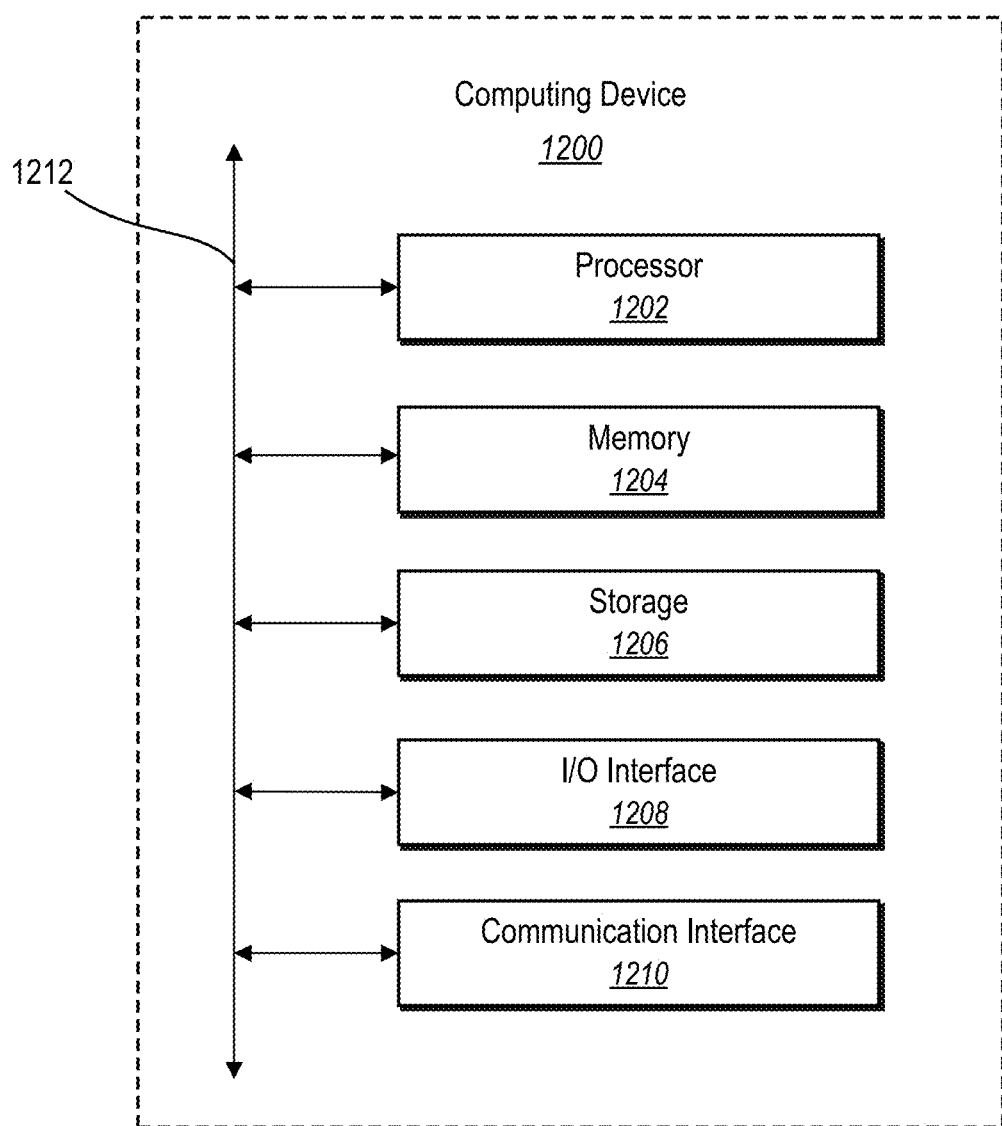
FIG. 12 illustrates a block diagram of an example computing device for implementing one or more embodiments of the present disclosure.

As further shown in FIG. 1, the client device 102 and the server device(s) 108 may be communicatively coupled with each other directly or indirectly, such as coupling through the network 106, which is described further in relation to FIG. 12. The client device 102 and the server device(s) 108 may include a variety of computing devices, including one or more computing devices as discussed further below in relation to FIG. 12. In some embodiments, the server device(s) 108 comprise a data server, a communication server, or a web-hosting server and can generate, store, receive, and/or transmit a variety of types of data, including digital design documents and/or modifications to digital design documents. In certain implementations, the client device 102 comprises a computing device that allows a corresponding user to generate, edit, receive, and/or send digital design documents including digital design objects.

Additionally, as shown in FIG. 1, the server device(s) 108 can include the content management system 110 and the design guide system 112. In general, the content management system 110 can facilitate the storage, rendering, and maintenance of various types of digital content. For example, the content management system 110 can manage digital design documents including digital design objects. Among other things, in some implementations, the content management system 110 can provide digital design documents to the design guide system 112.

In addition to management of various digital content, the content management system 110 can include the design guide system 112. In some embodiments, the design guide system 112 generates, manages, and utilizes visual constraint guides. More specifically, the design guide system 112 can receive user interactions indicating transformations to perform with regard to visual constraint guides. The design guide system 112 can apply those transformations to both the visual constraint guides and digital design objects corresponding to (e.g. intersecting) the visual constraint guides. To illustrate, the design guide system 112 can apply transformations to digital design objects relative to corresponding visual constraint guides.

As suggested by previous embodiments, the design guide system 112 can be implemented in whole or in part by the individual elements of the system 100. Although FIG. 1 illustrates the design guide system 112 implemented within the server device(s) 108, components of the design guide system 112 can be implemented in other components of the system 100. For instance, in some embodiments, the client device 102 implements the design guide system 112 and performs (in whole or in part) the functions, methods, and processes of the design guide system 112.

As discussed above, the design guide system 112 can generate visual constraint guides and utilize the visual constraint guides to implement transformations to digital design objects utilizing the visual constraint guides. More specifically, FIG. 2 illustrates an overview for generating visual constraint guides and transforming visual constraint guides and associated digital design objects.

Figure 2:
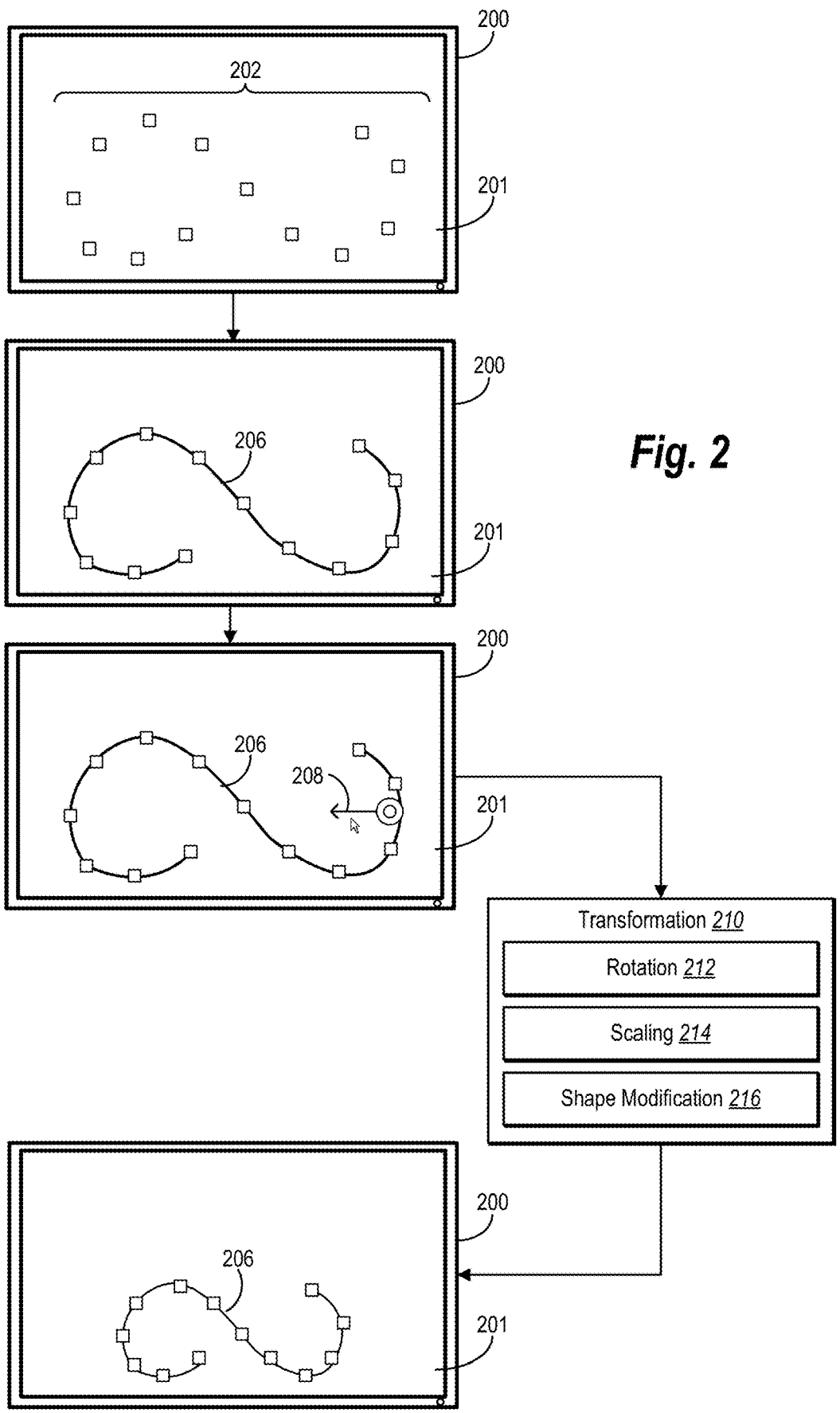
FIG. 2 illustrates a diagram of generating and transforming visual constraint guides and associated objects in accordance with one or more embodiments.

For example, FIG. 2 illustrates a computing device 200 with a user interface portraying a digital design document 201 including digital design objects 202. In particular, the design guide system 112 generate the digital design objects 202 based on user interaction with the digital design document. For example, the design guide system 112 can receive user input with respect to drawing, copying, inputting, or otherwise creating the digital design objects 202. As illustrated, the digital design objects 202 of FIG. 2 are square shapes spaced irregularly throughout the digital design document. Although FIG. 2 illustrates a particular set of shapes in a particular arrangement, the design guide system 112 can generate a variety of shapes in a variety of configurations.

As further shown in FIG. 2, the design guide system 112 generate a visual constraint guide 206 intersecting the digital design objects 202. As mentioned above, the design guide system 112 can generate the visual constraint guide 206 automatically or based on user input. For example, the design guide system 112 can automatically generate the visual constraint guide 206 in response to selection of a set of digital design objects to be modified. In addition or in the alternative, the design guide system 112 can receive user input designating a shape and/or size of the visual constraint guide. The design guide system 112 can receive this user input via selection of a shape and placement of the shape in the digital design document or via user input "drawing" the visual constraint guide.

The design guide system 112 can dynamically monitor interactions with the visual constraint guide 206 and/or the digital design objects 202 to identify digital design objects intersecting the visual constraint guide. For example, the design guide system 112 can identify movement of the visual constraint guide and determine digital design objects intersecting the visual constraint guide after the movement. Similarly, the design guide system can identify movement of digital design objects and determine digital design object intersecting the visual constraint guide after the movement. Accordingly, the visual constraint guide is "magnetic" in that it is automatically associated with intersecting digital design objects as components move within the digital design document.

Additionally, the design guide system 112 can monitor the alignment and distribution of the digital design objects 202 relative to the visual constraint guide 206. Indeed, as the visual constraint guide and digital design objects change within the digital design document, the design guide system 112 can monitor the relative alignment and distribution of the digital design objects relative to the visual constraint guide. Upon identifying a transformation to the visual constraint guide, the design guide system 112 can maintain the alignment and distribution of intersecting digital design objects relative to the transformed visual constraint guide.

For example, as shown in FIG. 2, the design guide system 112 can receive a user input 208. As shown in FIG. 2, the design guide system 112 receives the user input 208 at the visual constraint guide 206. More specifically, the user input 208 shown in FIG. 2 drags the visual constraint guide 206 inward, indicating a reduction in scale of the visual constraint guide 206. However, the design guide system 112 can receive, interpret, and implement a variety of user interactions with the visual constraint guide 206. To illustrate, the design guide system 112 can identify a transformation to the visual constraint guide 206 based on the direction and placement of the user input 208.

As shown in FIG. 2, based on the user input 208, the design guide system 112 can identify and implement a transformation 210. As shown in FIG. 2, the transformation 210 can include any of a rotation 212, a scaling 214, and/or a shape modification 216. For example, the user input 208 can indicate a rotation to the visual constraint guide 206, a scaling of the visual constraint guide 206, and/or a modification to the shape of the visual constraint guide 206.

FIG. 2 illustrates the design guide system 112 applying the scaling 214. More specifically, FIG. 2 illustrates the design guide system 112 transforming the visual constraint guide 206 to a smaller size/scale. Moreover, the design guide system 112 also transforms the positions of digital design objects 202 along the visual constraint guide 206. The design guide system 112 performs the scaling 214 by determining a scaling factor for the visual constraint guide 206 based on the user input 208. Accordingly, the design guide system 112 can apply the scaling factor to the visual constraint guide 206 and to the digital design objects 202 while maintaining the alignment and distribution of the digital design objects 202 relative to the visual constraint guide 206. Thus, if the visual constraint guide 206 is scaled in half, the spacing between the digital design objects 202 is also scaled in half in determining their new positions relative to the visual constraint guide 206.

Although FIG. 2 illustrates the scaling 214, the design guide system 112 can perform a variety of transformations to the visual constraint guide 206. For example, The design guide system 112 can implement the rotation 212 by identifying a hinge point corresponding to the visual constraint guide and a rotation angle around the hinge point corresponding to the user input 208. Accordingly, the design guide system 112 can apply the rotation while maintaining the distribution and alignment of the digital design objects 202 relative to the visual constraint guide 206.

In addition, the design guide system 112 can apply the shape modification 216. To illustrate, the visual constraint guide can receive user input reshaping one or more portions of the visual constraint guide 206. The design guide system 112 can utilize guide anchors on the visual constraint guide 206 to allow reshaping of segments of the visual constraint guide 206. Further, in response to reshaping the visual constraint guide 206, the design guide system 112 can modify the scaling and rotation of the digital design objects 202 along the 206. Similar to discussion above, the design guide system 112 can rescale and rotate the digital design objects 202 while maintaining their alignment and distribution relative to the modified shape of the visual constraint guide 206.

The design guide system 112 can also apply a translation of the visual constraint guide 206 and accordingly the digital design objects 202. More specifically, the design guide system 112 can receive user input translating the visual constraint guide 206 (e.g. moving the visual constraint guide 206 within the digital design document). Further, the design guide system 112 can transfer the translation of the visual constraint guide 206 to each of the attached digital design objects 202. For example, the design guide system 112 can move the digital design objects 202 in the same direction the same distance as the visual constraint guide by maintaining alignment and distribution of the digital design objects 202 relative to the visual constraint guide 206.

Figure 3A:
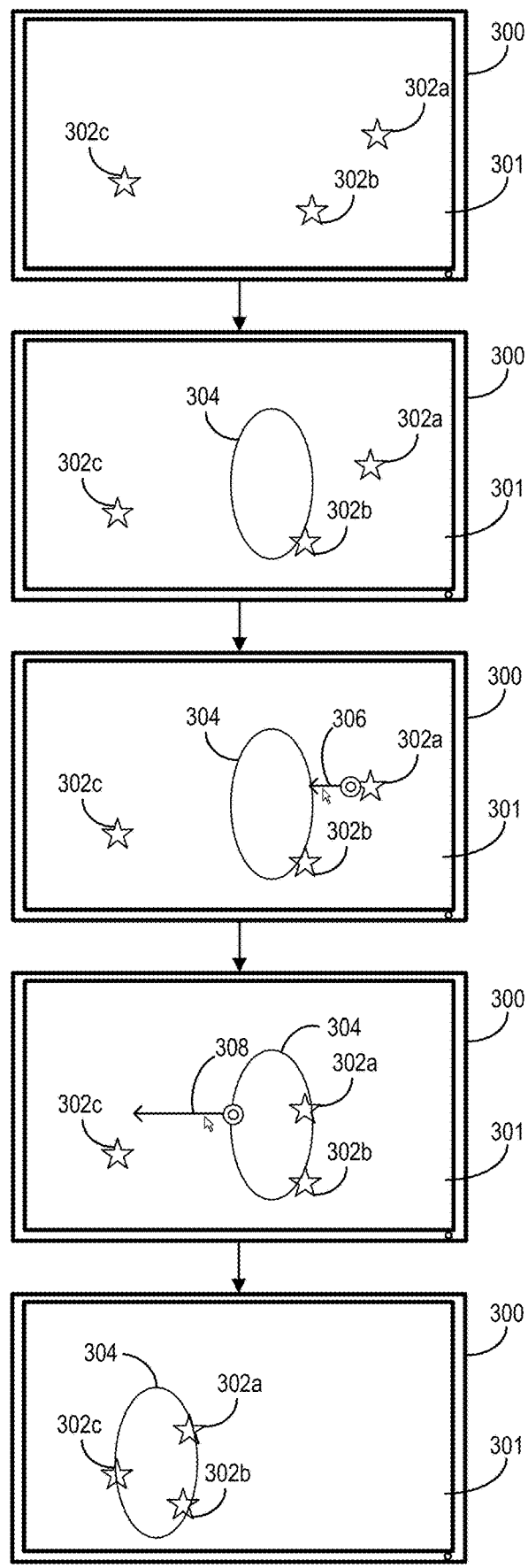
FIG. 3A illustrates a diagram of generating a visual constraint guide and adding digital design objects to a visual constraint guide in accordance with one or more embodiments.
Figure 3B:
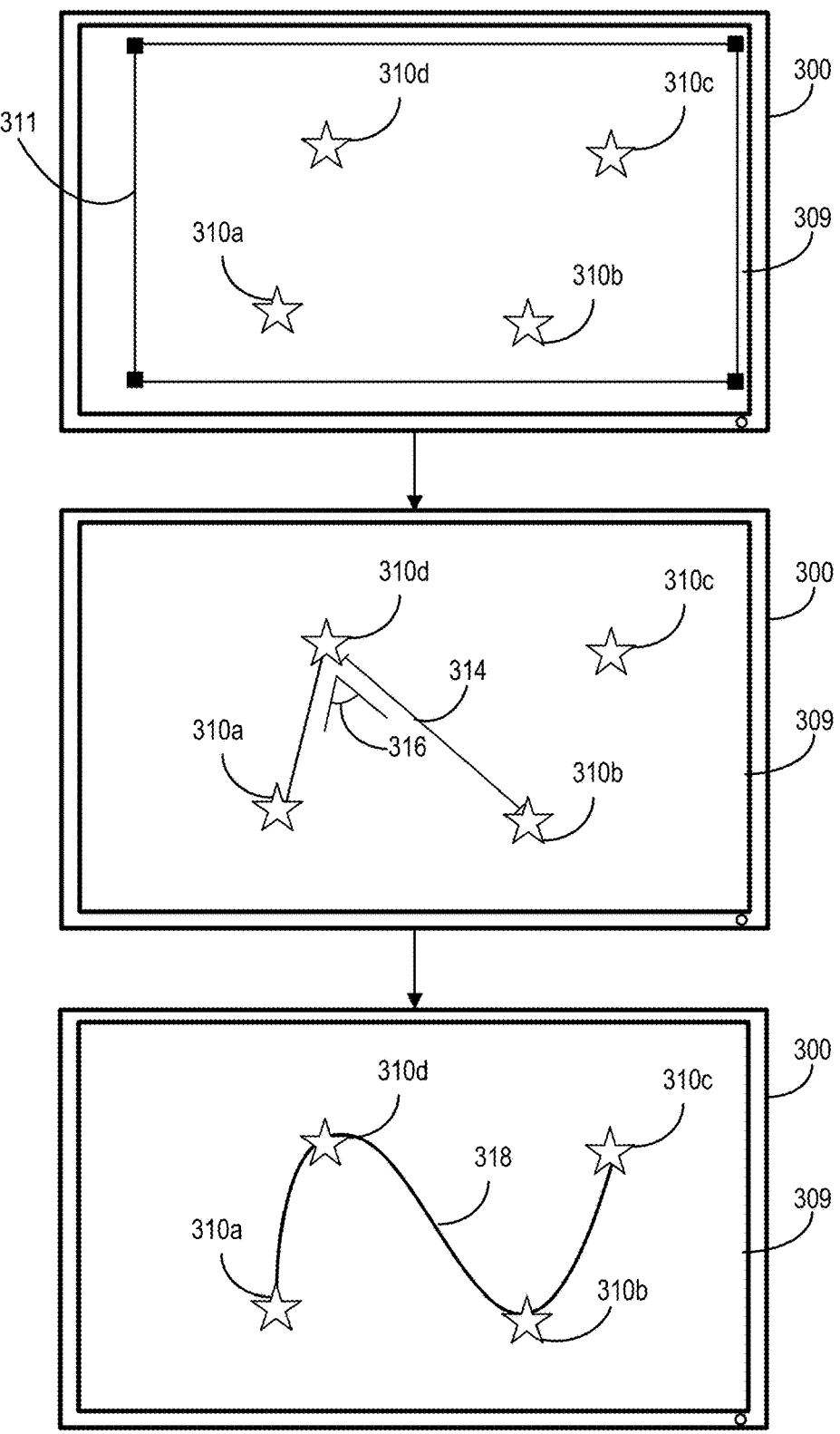
FIG. 3B illustrates a diagram of generating a visual constraint guide based on selection of a set of digital design objects in accordance with one or more embodiments.

As mentioned above, the design guide system 112 can generate visual constraint guides and dynamically identify sets of intersecting digital design objects. FIGS. 3A-3B illustrate generating visual constraint guides and identifying intersecting digital design objects in accordance with one or more embodiments. More specifically, FIG. 3A illustrates generating a visual constraint guide (based on user selection of a shape, size, and placement of a visual constraint guide) and adding intersecting digital design objects to a visual constraint guide (based on motion of the digital design objects and/or the visual constraint guide).

For example, FIG. 3A illustrates a computing device 300 with a user interface portraying a digital design document 301, which includes digital design objects 302*a*-302*c*. As discussed above, the design guide system 112 can generate the digital design objects 302*a*-302*c*. For example, the design guide system 112 can receive user input drawing the digital design objects and/or copy, import, or automatically create the digital design objects 302*a*-302*c*. As discussed above, the design guide system 112 can modify the digital design objects 302*a*-302*c* utilizing a visual constraint guide.

In particular, FIG. 3A illustrates the design guide system 112 generating the visual constraint guide 304. In relation to FIG. 3A, the design guide system 112 generates the visual constraint guide 304 based on user interaction with selectable options for shapes. In particular, the design guide system 112 receives a selection of an "oval" shape and further receives user interaction to place and size the selected shape within the digital design document. Thus, the design guide system 112 can determine the size, orientation, and position of the visual constraint guide 304.

As mentioned above, in some embodiments, the design guide system 112 can generate the visual constraint guide 304 based on other user inputs. For example, the design guide system 112 can receive user input drawing the geometric shape of the visual constraint guide 304. As described in greater detail below (e.g., in relation to FIG. 3B), the design guide system 112 can also automatically generate visual constraint guides.

Additionally, upon generation of the visual constraint guide 304, the design guide system 112 can identify any digital design objects intersecting the visual constraint guide 304. More specifically, the design guide system 112 can identify all digital design objects intersecting the visual constraint guide 304 and attach such objects to the visual constraint guide. For example, as shown in FIG. 3A, the visual constraint guide 304 intersects the digital design object 302*b*.

In one or more embodiments, the design guide system 112 dynamically monitors intersections between digital design objects and visual constraint guides utilizing a threshold intersection distance. To illustrate, the design guide system 112 can determine a distance between a visual constraint guide and a digital design object and determine whether that distance satisfies a threshold intersection distance. If the distance does satisfy the threshold intersection distance, the design guide system 112 can determine that the visual constraint guide intersects the digital design object. In addition or in the alternative, the design guide system 112 can determine an intersection based on a digital design object touching a visual constraint guide.

The design guide system 112 can also dynamically monitor digital design objects and visual constraint guides to associate digital design objects to corresponding visual constraint guides (e.g. to attach digital design objects to corresponding visual constraint guides). For example, the design guide system 112 can add the digital design object 302*a* to a set of intersecting digital design objects (attached to the visual constraint guide 304). Specifically, the design guide system 112 can add the digital design objects to a list of digital design objects for modification in accordance with the constraints of the design guide system 112. Similarly, the design guide system 112 can maintain a list of visual constraint guides associated with digital design objects. For example, the design guide system 112 can add the visual constraint guide 304 to a set of visual constraint guides associated with the digital design object 302*a*. In some embodiments, the design guide system 112 utilizes these associations (e.g. these lists of digital design objects and corresponding visual constraint guides) in applying transformations to digital design objects based on transformations received at visual constraint guides.

For example, as shown in FIG. 3A, the design guide system 112 receives a user input 306 at the digital design object 302*b*. More specifically, the design guide system 112 moves the digital design object 302b onto the visual constraint guide 304 based on the user input 306. In response to this updated location for the digital design object 302b, the design guide system 112 can determine that the digital design object 302b intersects the visual constraint guide 304. Accordingly, the design guide system 112 can attach the digital design object 302b to the visual constraint guide 304 and update the data structures corresponding to the visual constraint guide 304 and the digital design object 302b accordingly (e.g., associate the digital design object 302b to the visual constraint guide 304 in a database, array, or other data structure).

Further, as shown in FIG. 3A, the design guide system 112 receives a user input 308 translating the visual constraint guide 304. More specifically, the design guide system 112 translates the visual constraint guide 304 to intersect the digital design object 302c. Based on receiving the user input 308 at the visual constraint guide 304, the design guide system 112 translates both the visual constraint guide 304 and the attached digital design objects 302a, 302b. Further, the design guide system 112 can determine, based on the updated position of the visual constraint guide 304, that the digital design object 302c intersects the visual constraint guide 304. Thus, the design guide system 112 can attach the digital design object 302c to the visual constraint guide 304 and update the data structures corresponding to the visual constraint guide 304 and the digital design object 302c accordingly.

As mentioned, the design guide system 112 can dynamically update recorded associations between digital design objects and visual constraint guides in response to motion of the digital design objects 302a-302c and/or the visual constraint guide 304. Thus, the design guide system 112 can dynamically update attachments and associations between digital design objects and visual constraint guides. In some embodiments, the design guide system 112 can process such updates, where o represents a digital design object, G and M represent visual constraint guides, $\Sigma_G$ represents the set of digital design objects associated with the visual constraint guide G, and $\Omega_o$ represents a set of visual constraint guides corresponding to a digital design object, utilizing the following computer-implemented algorithm.

```
1:    for each o_i present in the canvas do
2:        if o_i intersect with G and o_i not Σ_G then
3:            if o_i is not a guide then
4:                add o_i in Σ_G
5:                add G in Ω_{o_i}
6:            else
7:                add G in M_G
8:                add o_i in M_{o_i}
```

In one or more embodiments, the design guide system 112 performs hit testing for digital design objects in response to updates to the digital design document. Further, the design guide system 112 can update data structures recording associations between digital design objects and visual constraint guides based on updated positions of digital design objects and/or visual constraint guides. Though FIG. 3A illustrates the addition of digital design objects 302a-302c to the visual constraint guide 304, the design guide system 112 can also identify and implement user input removing a digital design object from intersecting a visual constraint guide. Thus, the design guide system 112 can detach the removed digital design object from the visual constraint guide and update the data structures corresponding to the visual constraint guide and the removed digital design object accordingly.

Moreover, although the visual constraint guide 304 of FIG. 3A is an oval intersecting the digital design object 302a, the design guide system 112 can generate the visual constraint guide 304 based on a variety of user inputs selecting a variety of shapes and sizes for the visual constraint guide 304. Further, although FIG. 3A illustrates particular shapes, the design guide system 112 can generate the visual constraint guide 304 to intersect a variety of digital design objects.

As mentioned above, the design guide system 112 can also automatically generate visual constraint guides. FIG. 3B illustrates the design guide system 112 automatically generating a visual constraint guide intersecting a set of selected digital design objects. As shown in FIG. 3B, the computing device 300 includes a digital design document 309 including digital design objects 310a-310d.

As illustrated in FIG. 3B, the design guide system 112 identifies a user selection 311. As shown, the user selection 311 identifies each of the digital design objects 310a-310d. In particular, the user selection 311 comprises a bounding box that surrounds the digital design objects 310a-310d. The design guide system 112 can receive a variety of user interactions (e.g., interaction with a lasso tool) to identify a variety of different digital design objects.

In one or more embodiments, in response to receiving user selection of the digital design objects 310a-310d, the design guide system 112 can automatically generate a visual constraint guide. In particular, the design guide system 112 can iteratively identify connections between the selected digital design objects and select/join the connections together utilizing a cost function. In some embodiments, the design guide system 112 utilizes a cost function based on geometric distance and deflection angle.

In some embodiments, in response to receiving user selection of the digital design objects 310a-310d, the design guide system 112 can identify a random digital design object of the digital design objects 310a-310d to begin generating a potential visual constraint guide. More specifically, the design guide system 112 can utilize the randomly selected digital design object of the digital design objects 310a-310d for a first iteration. For example, as shown in FIG. 3B, the digital design object 310a is selected as the starting digital design object. The design guide system 112 can determine distances between the digital design object 310a and each other digital design object 310b-310d. In some embodiments, the design guide system 112 connects the randomly selected digital design object 310a to the nearest digital design object based on geometric distance, in this example the digital design object 310d.

Further, in relation to FIG. 3, the design guide system 112 determines geometric distances between each of the digital design objects 310a-310d. For example, as shown in FIG. 3B, the design guide system 112 can determine the geometric distance 314 between the digital design object 310d and the digital design object 310b. In one or more embodiments, the design guide system 112 determines the geometric distance 314 between the geometric center of the digital design object 310d and the geometric center of the digital design object 310b. For example, the design guide system 112 can utilize a geometric center as the center of the mass of a digital design object and/or the center of a bounding box associated with a digital design object. Though FIG. 3B illustrates the geometric distance 314, it will be appreciated that the design guide system 112 can determine geometric distances between each of the digital design objects 310a-310d.

Further, the design guide system 112 determines deflection angles between each of the digital design objects 310a-310d. In some embodiments, the design guide system 112 determines deflection angles based on the angle between a first line intersecting two digital design objects and a second line representing a segment of the visual constraint guide. For example, as shown in FIG. 3B, the design guide system 112 can determine a deflection angle 316 between the line connecting the digital design object 310a and the digital design object 310d and a line that would connect the digital design object 310d and the digital design object 310b. While not shown in FIG. 3B, the design guide system 112 can further determine a deflection angle for each digital design object 310b-310c to determine which digital design object 310b-310c to connect to the digital design object 310d. Further, the design guide system 112 can determine additional deflection angles in future iterations to generate further connections.

The design guide system 112 can combine deflection angles and geometric distances to determine cost metrics for connections among the set of digital design objects 310a-310d. For example, the design guide system 112 can determine a weighted combination between the deflection angle 316 and the geometric distance 314 to generate a cost metric for the connection between the digital design object 310d and the digital design object 310b.

The design guide system 112 can identify a variety of connections between digital design objects and corresponding cost metrics for the connections. Moreover, the design guide system 112 can compare the cost metrics to select connections in generating a visual constraint guide. For example, the design guide system 112 can determine an additional cost metric between the digital design object 310d and the digital design object 310c (based on geometric distance and deflection angle). The design guide system 112 can compare the cost metric for the connection between the digital design object 310d and the digital design object 310b with the additional cost metric for the connection between the digital design object 310d and 310c. Based on the comparison, the design guide system 112 can select a connection (e.g., select the connection with the lowest cost).

Further, the design guide system 112 can select a subset of connections from a set of possible connections among the digital design objects 310a-310d. For instance, the design guide system 112 can iteratively analyze connections in a sequence of digital design guides and select the connection with the lowest cost metric. The design guide system 112 can combine the determined subset of connections to generate the visual constraint guide.

Accordingly, the design guide system 112 can analyze the deflection angles and geometric distances to connect the digital design objects 310a-310d and generate the visual constraint guide 318. More specifically, the design guide system 112 can combine a determined subset of connections to generate the visual constraint guide 318. As shown in FIG. 3B, the visual constraint guide 318 is an irregular line connecting each of the digital design objects 310a-310d.

More specifically, the design guide system 112 can determine a cost metric as a function of minimal deflection between selected digital design objects and minimum magnitude of geometric distances between selected digital design objects. More specifically, where $O_i$ and $O_j$ represent digital design objects, the design guide system 112 can determine a cost metric utilizing the following algorithm:

1: Cost is a function of
  1. minimal deflection between the objects $O_i$ and $O_j$
  2. minimal magnitude of the geometric distance between the objects $O_i$ and $O_j$ As mentioned above, some embodiments, the design guide system 112 determines a first connection for the visual constraint guide based on geometric distance. In some embodiments, upon connecting all digital design objects, the design guide system 112 utilizes the cost algorithm to check that, based on all utilized geometric distances and deflection angles, the visual constraint guide has the lowest overall cost.

Accordingly, the design guide system 112 can determine cost metrics associated with each pair of the selected set of digital design objects. Further, the design guide system 112 can generate a visual constraint guide by analyzing the set of digital design objects utilizing the determined cost metrics. In one or more embodiments, the design guide system 112 starts with a random digital design object and identifies the digital design object having the lowest cost metric relative to the random digital design object. In some embodiments, the design guide system 112 connects the random digital design object with the identified digital design object. Further, the design guide system 112 can iteratively identify the digital design object having the lowest cost metric relative to each of the selected digital design object. The design guide system 112 can then connect each selected digital design object to both minimize cost metrics and ensure that each selected digital design object is included in the same visual constraint guide. Accordingly, the design guide system 112 can generate the visual constraint guide based on the determined connections between the selected digital design objects.

To illustrate, the design guide system 112 can generate a visual constraint guide utilizing the following algorithm.

| | |
|---|---|
| 1: | Initialize an Ordered List L of nearest objects with a random object |
| 2: | for till all objects in selection are not processed do |
| 3: |    for each $o_i$ as next object do |
| 4: |       if $o_i$ has the minimum cost based on algortihm 6 then |
| 5: |          add $o_i$ to L |
| 6: | Create a path joining the centers of the objects taken in order |
| 7: | Simplify the geometry of path to remove outliers and irregularities |
| 8: | Convert shape to Guide G |
| 9: | Recommend the G as a suggestion during user workflows |

Further, in one or more embodiments, the design guide system 112 can smooth the visual constraint guide utilizing a smoothing algorithm. That is, the design guide system 112 can utilize a smoothing algorithm to generate a visual constraint guide including smoothed curves rather than jagged connections between each digital design object. For example, the design guide system 112 can utilize a curve fitting algorithm, an interpolating spline, a linear smoother, exponential smoothing, a kernel smoother, and/or a variety of other smoothing algorithms to generate the visual constraint guide 318.

Figure 4:
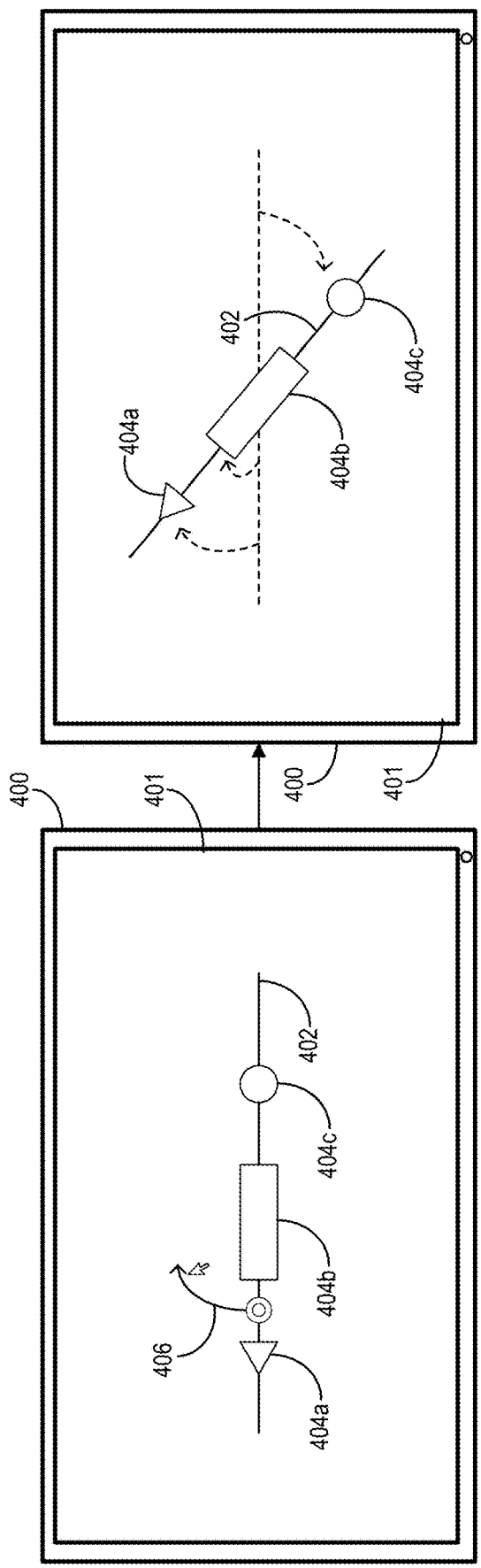
FIG. 4 illustrates a diagram of performing a rotation transformation utilizing a visual constraint guide in accordance with one or more embodiments.

As discussed above, the design guide system 112 can perform a variety of transformations to visual constraint guides and corresponding digital design objects. For example, the design guide system 112 can apply rotations to visual constraint guides. FIG. 4 illustrates the design guide system 112 applying a rotation of a visual constraint guide 402 and associated digital design objects 404a-404c in accordance with one or more embodiments. More specifically, FIG. 4 illustrates a computing device 400 with a user interface portraying a digital design document 401.

As shown in FIG. 4, the design guide system 112 receives a user input 406 at the visual constraint guide 402. The design guide system 112 can receive a variety of user inputs in a variety of contexts and implementations. For example, in a desktop implementation, the design guide system 112 can receive a click and drag transforming the visual constraint guide. In another example, in a touch screen implementation, the design guide system 112 can receive a touch and drag transforming the visual constraint guide.

Further, the design guide system 112 can interpret a variety of types of user input to determine a transformation to apply to the visual constraint guide 402. For example, in FIG. 4, the design guide system 112 interprets the user input 406 to determine a direction and magnitude of the rotation. To illustrate, the design guide system 112 can identify that a user input corresponds to a rotation based on the direction of the user input relative to the visual constraint guide 402, the type of user input utilized, etc.

In one or more embodiments, the design guide system 112 implements a rotation transformation relative to a hinge point corresponding to the visual constraint guide 402. The design guide system 112 can identify a hinge point in a variety of ways. For example, the design guide system 112 can identify a hinge point based on user input (e.g., a two-finger press and rotation, with one of the fingers defining a hinge-point). Similarly, the design guide system 112 can identify a hinge point for the visual constraint guide 402 by determining the center point of the visual constraint guide. The design guide system 112 can determine the center point of the visual constraint guide 402 by determining an average point of each point included in the visual constraint guide 402.

To apply the rotation, the design guide system 112 rotates the visual constraint guide 402 around the hinge point. As shown in FIG. 4, the hinge point is the center point, and the design guide system 112 rotates the visual constraint guide 402 around the hinge point to the degree indicated by the user input 406. Further, the design guide system 112 rotates the digital design objects 404a-404c around the hinge point to the same degree as the visual constraint guide. More specifically, the design guide system 112 rotates the digital design objects 402a-402c around the hinge point of the visual constraint guide. Accordingly, the design guide system 112 can apply the rotation to the digital design objects 402a-402c while maintaining the distribution and alignment of the digital design objects 402a-402c relative to the visual constraint guide 402.

To illustrate, the alignment of the digital design object 404b is parallel to the visual constraint guide 402 before transformation. Accordingly, to maintain the alignment (e.g. an alignment constraint) of the digital design object 404b relative to the visual constraint guide 402, the design guide system 112 modifies the orientation of the digital design object 404b such that the transformed digital design object 404b is parallel to the transformed visual constraint guide 402. Thus, the design guide system 112 can maintain the alignment of digital design objects relative to attached visual constraint guides.

Figure 5:
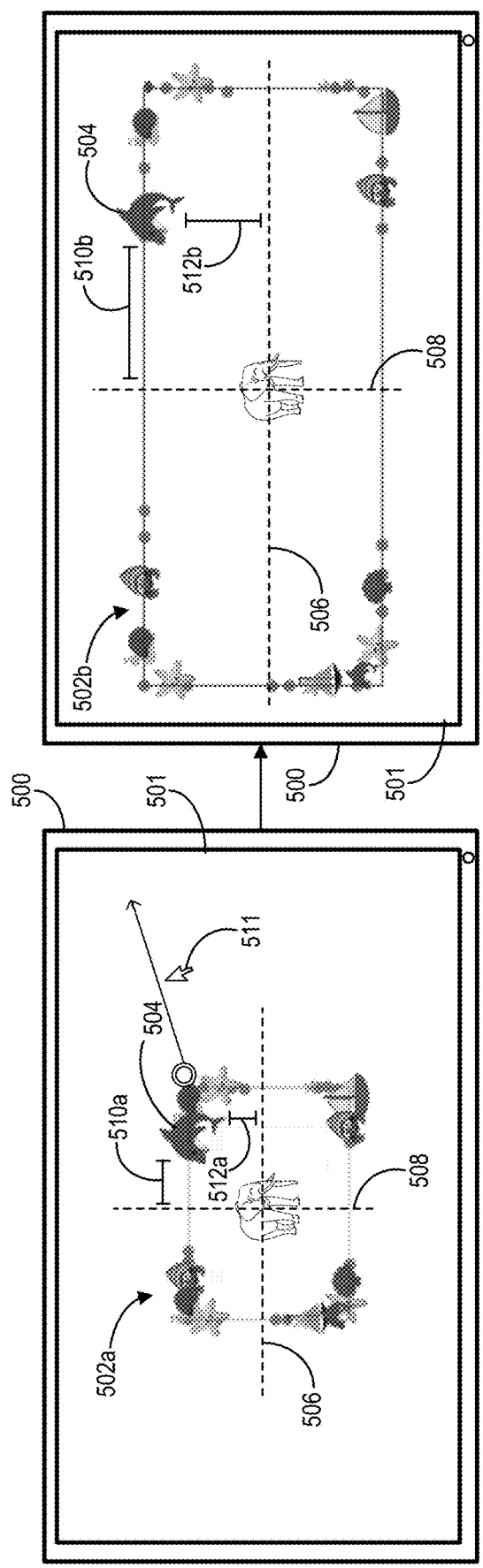
FIG. 5 illustrates a diagram of performing a scaling transformation utilizing a visual constraint guide in accordance with one or more embodiments.

As also discussed above, the design guide system 112 can apply a scaling transformation to a visual constraint guide and attached digital design objects. FIG. 5 illustrates a computing device 500 with a user interface portraying a digital design document 501. As shown in FIG. 5, the design guide system 112 performs an example scaling in the digital design document 501 of an initial visual constraint guide 502a to a transformed visual constraint guide 502b. More specifically, the design guide system 112 maintains the distribution and alignment of digital design objects relative to the visual constraint guide. Additionally, in one or more embodiments, the design guide system 112 scales the relative positions the digital design objects along the visual constraint guide without modifying the size of the digital design objects.

Further, as mentioned above, the design guide system 112 can perform a transformation while maintaining the distribution (e.g. a distribution constraint) of digital design objects relative to a visual constraint guide. To illustrate, the design guide system 112 can modify the positions of the digital design objects without modifying the distribution of the digital design objects relative to the initial visual constraint guide 502a. As shown in FIG. 5, the digital design objects are spaced irregularly around the initial visual constraint guide 502a. Accordingly, the design guide system 112 can modify the positions of the digital design objects along the visual constraint guide 502b to maintain the same relative distance between the visual constraint guides. The design guide system 112 can determine updated distances based on a scaling factor for the scaling. That is, the proportionate spacing between the shapes remains the same relative to the size of the guide. Specifically, if the guide is twice large, the horizontal and vertical spacing is also twice the original spacing.

As shown in FIG. 5, the initial visual constraint guide 502a intersects a digital design object 504. The initial visual constraint guide 502a also intersects a variety of other digital design objects, and the digital design objects 504 is given by way of example. As also illustrated in FIG. 5, the initial visual constraint guide 502a has a vertical geometric center 506 and a horizontal geometric center 508. The design guide system 112 can measure the distance between the digital design object 504 (e.g. a geometric center of the digital design object 504) and these geometric centers corresponding to the visual constraint guide.

For example, the design guide system 112 can determine a difference between a geometric center of a visual constraint guide and a geometric center of a digital design object. More specifically, as shown in FIG. 5, the design guide system 112 can determine an initial horizontal distance 510a between the vertical geometric center 506 and the digital design object 504. Additionally, the design guide system 112 can determine an initial vertical distance 512a between the horizontal geometric center 508 and the digital design object 504. Accordingly, the design guide system 112 can generate a scaling position change for a transformed digital design object utilizing the difference and the scaling factor.

Though FIG. 5 illustrates the design guide system 112 utilizing geometric center guides, it will be appreciated that the design guide system 112 can apply a scaling transformation based on a variety of reference points. For example, in one or more embodiments, the design guide system 112 can scale a visual constraint guide relative to a selected line or point. Accordingly, the design guide system 112 can determine a transformed visual constraint guide and updated positions and orientations for attached digital design objects relative to the selected line or point.

Further, as shown in FIG. 5, the design guide system 112 can receive a user input 511 at the initial visual constraint guide 502a. More specifically, FIG. 5 illustrates the initial visual constraint guide 502a moving outward from the initial visual constraint guide 502a. The design guide system 112 can interpret such an input as representing an upscaling of the initial visual constraint guide 502a.

In one or more embodiments, the design guide system 112 interprets the user input 511 to determine a horizontal magnitude and a vertical magnitude of the scaling transformation. In one or more embodiments, the design guide system 112 utilizes the horizontal magnitude as a horizontal scaling factor and the vertical magnitude as a vertical scaling factor. In some embodiments, the design guide system 112 utilizes the horizontal scaling factor and vertical scaling factor to determine an updated size for the initial visual constraint guide 502a. For example, as shown in FIG. 5, the design guide system 112 generates a transformed visual constraint guide 502b by applying the horizontal scaling factor and vertical scaling factor to the size of the initial visual constraint guide 502a.

Further, the design guide system 112 can utilize the scaling factors to determine updated positions for the digital design objects attached to the initial visual constraint guide 502a, including the digital design object 504. More specifically, in some embodiments, the design guide system 112 determines updated positions for the digital design object 504 based on the center coordinates of the initial visual constraint guide 502a, the center coordinates of the digital design object, the horizontal scaling factor, and the vertical scaling factor. The design guide system 112 can utilize a difference between center coordinates of the initial visual constraint guide 502a and the center coordinates of the digital design object 504. For example, the design guide system 112 can utilize the initial horizontal distance 510a and the initial vertical distance 512a.

In some embodiments, the design guide system 112 also utilizes the vertical scaling factor and horizontal scaling factor expressed as a percentage to determine updated coordinates for the initial visual constraint guide 502a and/or the digital design object 504. To illustrate, where dx represents a horizontal change, dy represents a vertical change, $(G_x, G_y)$ represents the center coordinates of a visual constraint guide, $(o_x, o_y)$ represents the center coordinates of a digital design object, $s_x$ represents a horizontal scaling factor, and $s_y$ represents a vertical scaling factor, the design guide system 112 can determine updated positions for the digital design object o utilizing:

$$dx = \left((G_x - o_x) * \frac{100 - s_x}{100}\right) \quad (1)$$

$$dy = \left((G_y - o_y) * \frac{100 - s_y}{100}\right) \quad (2)$$

The above functions determine a scaling position change for the digital design objects. To illustrate, the design guide system 112 determines a scaling position change as an expected output for a scaling transformation in terms of a directional distance vertically and/or horizontally from the initial position of the digital design object 504. As shown in FIG. 5, the design guide system 112 utilizes these directional distances to determine the transformed horizontal distance 510b and the transformed vertical distance 512b for the digital design object 504. More specifically, the design guide system 112 can determine a sum of the initial vertical coordinate of the digital design object 504 and the vertical change to determine an updated vertical coordinate of the digital design object 504. Similarly, in some embodiments, the design guide system 112 determines an updated horizontal coordinate of the digital design object 504 by determining a sum of the initial horizontal coordinate and the horizontal change. The design guide system 112 can utilize the updated horizontal coordinate and updated vertical coordinate as transformed coordinates for the digital design object 504. Thus, the design guide system 112 accordingly can determine an updated position for the digital design object 504 that overlaps with the position of the digital design object 504 along the transformed visual constraint guide 504b if the digital design object 504 had been scaled in size along with the transformed visual constraint guide 504b.

Though FIG. 5 illustrates a rectangular initial visual constraint guide 502a with a variety of nautical digital design objects, it will be appreciated that the design guide system 112 can scale a variety of shapes and designs of visual constraint guides. Additionally, though FIG. 5 illustrates an upscaling of the initial visual constraint guide 502a, it will be appreciated that the design guide system 112 can implement a variety of transformations to scale, including upscaling or downscaling along either and/or both axes of a visual constraint guide. To illustrate, the visual constraint guide can upscale vertically and downscale horizontally based on a single user input.

Figure 6:
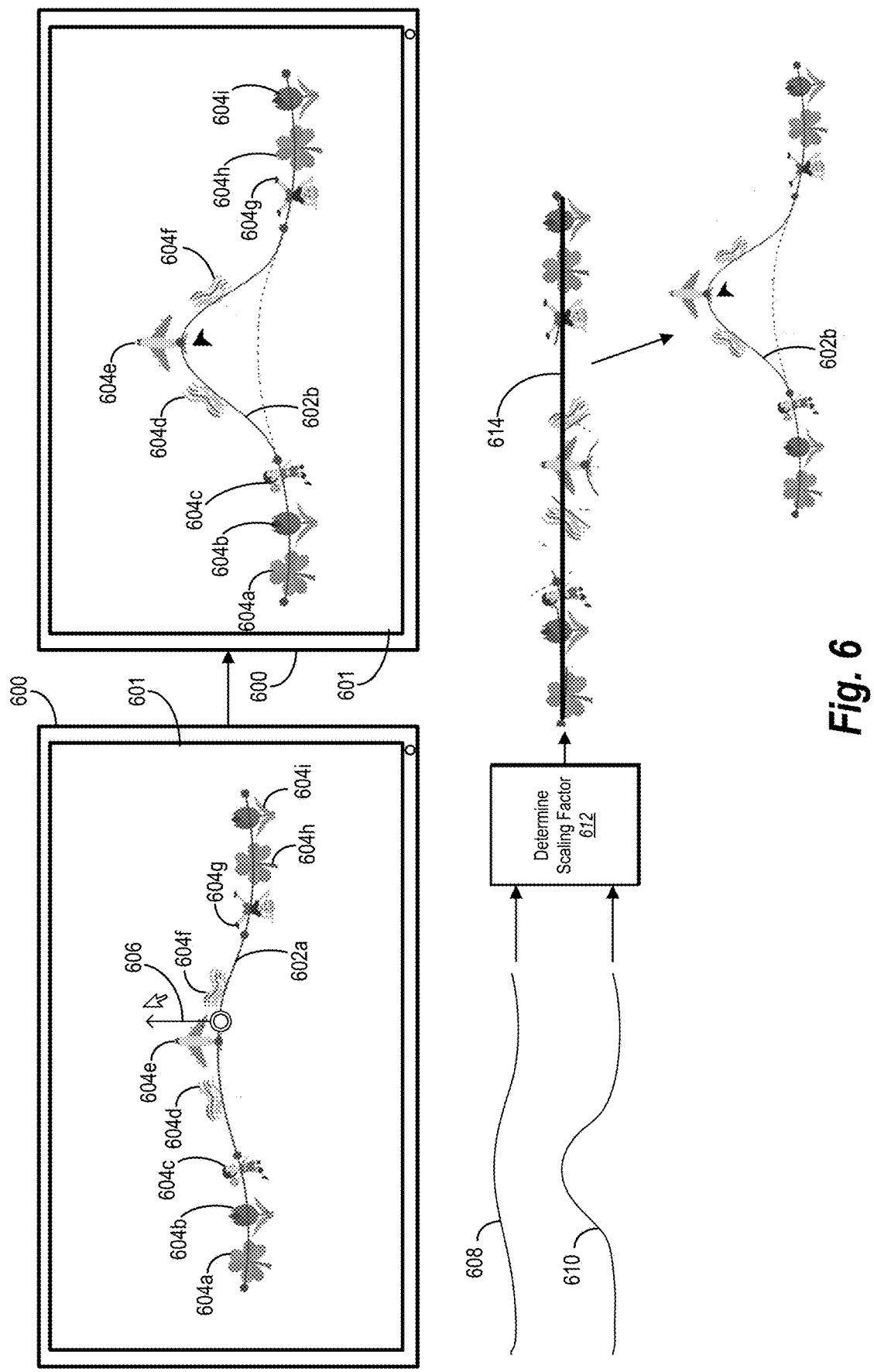
FIG. 6 illustrates a diagram of performing a shape modification of a visual constraint guide and corresponding transformation of digital design objects in accordance with one or more embodiments.

In addition to scaling the size of a visual constraint guide, the design guide system 112 can also update the shape of a visual constraint guide. Further, the visual constraint guide can update the positions and orientations of digital design objects along the visual constraint guide based on the shape modification to the visual constraint guide. FIG. 6 illustrates a computing device 600 portraying a digital design document 601 in a user interface. More specifically, FIG. 6 illustrates an example process for applying a shape modification to an initial visual constraint guide 602a to generate a transformed visual constraint guide 602b.

As shown in FIG. 6, the initial visual constraint guide 602a and the transformed visual constraint guide 602b intersect the digital design objects 604a-604i. FIG. 6 illustrates the initial visual constraint guide 602a and the transformed visual constraint guide 602b as a curved line intersecting the digital design objects 604a-604i. As shown in FIG. 6, the design guide system 112 receives an indication of a user input 606 with the initial visual constraint guide 602a indicating a shape modification. More specifically, the user input 606 indicates a reshaping of the initial visual constraint guide 602a into a different curve. Accordingly, the design guide system 112 generates the transformed visual constraint guide 604b with the modified curve indicated by the user input 606.

Additionally, the design guide system 112 can apply the shape modification to the digital design objects 604a-604i while maintaining the orientation and distribution of the digital design objects 604a-604i relative to the initial visual constraint guide 602a. As shown in FIG. 6, the design guide system 112 can utilize an initial curve 608 relative to a transformed curve 610 to perform an act 612 of determining a scaling factor. More specifically, the design guide system 112 can determine a scaling factor corresponding to a transformation by calculating differences in shape and size between the initial curve 608 and the transformed curve 610. More specifically, the design guide system 112 can map the initial curve 608 to a linear space (forming a first linear guide path) and map the transformed curve 610 to a linear space (forming a second linear guide path). The design guide system 112 can then determine a length corresponding to the first linear guide path and a length corresponding to the second linear guide path. In one or more embodiments, the design guide system 112 determines a scaling factor for the initial visual constraint guide 602a by comparing the length corresponding to the first linear guide path and the length corresponding to the second linear guide path.

In one or more embodiments, the design guide system 112 applies the scaling factor to the attachment points of each of the digital design objects 604a-604i. Based on this application, the design guide system 112 determines transformed positions for the set of digital design objects 604a-604i along a transformed linear path 614. In some embodiments, the design guide system 112 determines the updated position along the transformed linear path 614 by applying the scaling factor to an attachment point of a digital design object relative to the initial visual constraint guide 602a.

To illustrate, the design guide system 112 can determine a scaling position change for the transformed set of digital design objects 604a-604i by mapping the initial visual constraint guide 602a to an initial linear path. The initial linear path includes the full linear length of the initial visual constraint guide 602a with each of the digital design objects 604a-604i mapped along the initial linear path. The design guide system 112 can map the digital design objects 604a-604i to the initial linear path based on their initial positions along the initial visual constraint guide 602a.

Further, in some embodiments, the design guide system 112 generates the transformed linear path 614 based on the initial linear path and the received transformation. More specifically, the design guide system 112 determines updated positions (e.g. attachment points) for each of the digital design objects 604a-604i on the transformed linear path 614. In one or more embodiments, the design guide system 112 utilizes the determined scaling factor to determine an updated position for each of the digital design objects 604a-604i along the transformed linear path 614.

The design guide system 112 can determine a scaling position change for the transformed set of digital design objects 604a-604i for the digital design objects 604a-604i along the transformed visual constraint guide 402b based on the updated positions along the transformed linear path 614. In one or more embodiments, the design guide system 112 maps each of the digital design objects 604a-604i from their positions on the transformed linear path 614 onto the transformed visual constraint guide 602b. Accordingly, the design guide system 112 can utilize initial and transformed linear mapped paths to determine updated positions for digital design objects that are attached to both linear and non-linear visual constraint guides.

Further, in one or more embodiments, the design guide system 112 determines the orientation of the center for each of the digital design objects 604a-604i. In some embodiments, the design guide system 112 determines the orientation of a digital design object by determining the tangent of the digital design object at the attachment point to the initial visual constraint guide 602a. Upon identifying the positions of the digital design objects 604a-604i on the transformed visual constraint guide 602b, the design guide system 112 can also rotate the digital design objects to maintain their alignment relative to the visual constraint guide.

For example, the design guide system 112 can determine the tangent of the initial visual constraint guide 602a at the initial attachment point of the digital design object 604d. Further, the design guide system 112 can determine the tangent of the transformed visual constraint guide 602b at the transformed attachment point of the digital design object 604d. In one or more embodiments, the design guide system 112 utilizes the difference between the initial tangent and the updated tangent to determine a change in orientation for the digital design object 604d. Thus, as shown in FIG. 6, the design guide system 112 modifies orientation of the digital design object 604d from nearly horizontal on the initial visual constraint guide 604d to a greater slope on the transformed visual constraint guide 602b.

As mentioned, the design guide system 112 can map the digital design objects 604a-604i along the generated linear path. To illustrate, to determine the transformed visual constraint guide 602b and the digital design objects 604a-604i, $\Sigma_M$ represents the set of digital design objects o associated with a visual constraint guide M, the design guide system 112 can utilize the following computer-implemented algorithm for an initial visual constraint guide $M_{old}$ and a corresponding transformed visual constraint guide $M_{new}$:

1: procedure PROGRESSGUIDEEDIT ($M_{old}$, $M_{new}$)
2:     Curved path is mapped to some linear oath before placement of object
3:     Similarly each attached object is mapped to that linear space.
4:     Please refer Adobe Ref. P - 834 - US for more detail.
5:     $l_{M_{old}}$ ← linear mapped path of $M_{old}$
6:     $l_{M_{new}}$ ← linear mapped path of $M_{new}$
7:     linear space is considered in steps below (unless mentioned)
8:     for each $o_i$ in $\Sigma_{M_{old}}$ do
9:         $p_i$ ← calculate the attachment point of $o_i$ in $l_{M_{old}}$
10:        $\theta_i$ ← calculate the orientation of center of $o_i$ witht the tangent at $p_i$ 11:     scale ← $\dfrac{\text{length}(l_{M_{new}})}{\text{length}(l_{M_{old}})}$ 12:     for each $p_i$ do
13:        pnew$_i$ ← scale * $p_i$
14:     Calculate the new position of each object $o_i$ based on pnew$_i$
15:     reverse map each object $o_i$ from linear space to curved space $l_{M_{new}}$ As mentioned briefly above, the design guide system 112 can generate and utilize higher order associations between visual constraint guides to implement transformations to multiple visual constraint guides based on a user interaction at a single visual constraint guide. To illustrate, the design guide system 112 can identify and manage intersections between visual constraint guides. Further, the design guide system 112 can translate, rotate, scale, and/or perform a variety of transformations to the visual constraint guides. In one or more embodiments, the design guide system 112 can treat an intersecting visual constraint guide as a digital design object in terms of re-positioning along a transformed visual constraint guide. That is, the design guide system 112 can maintain the alignment and orientation of both digital design objects and visual constraint guides relative to a transformed visual constraint guide.

The design guide system 112 can monitor and record associations between visual constraint guides. More specifically, the design guide system 112 can generate digital records of the set of visual constraint guides connected to each visual constraint guide. Similarly to utilization of recorded sets of attached digital design objects, the design guide system 112 can utilize these records of attached visual constraint guides to implement transformations to the visual constraint guides.

Figure 7A:
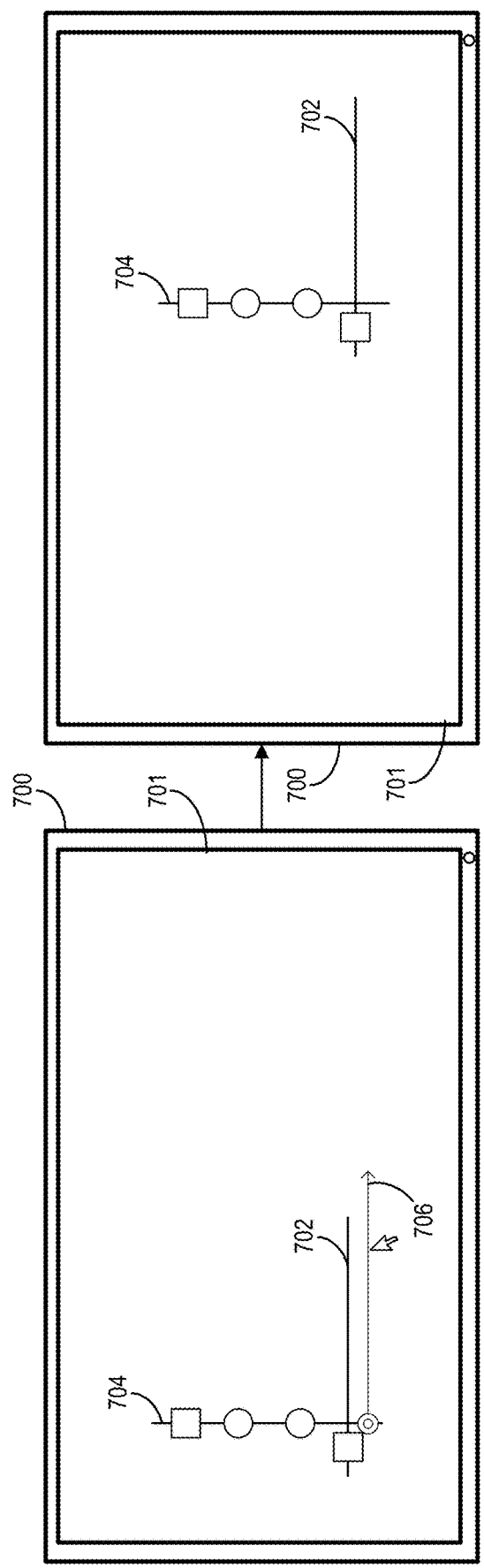
FIGS. 7A-7C illustrate diagrams of performing transformations utilizing multiple visual constraint guides in accordance with one or more embodiments.
Figure 7B:
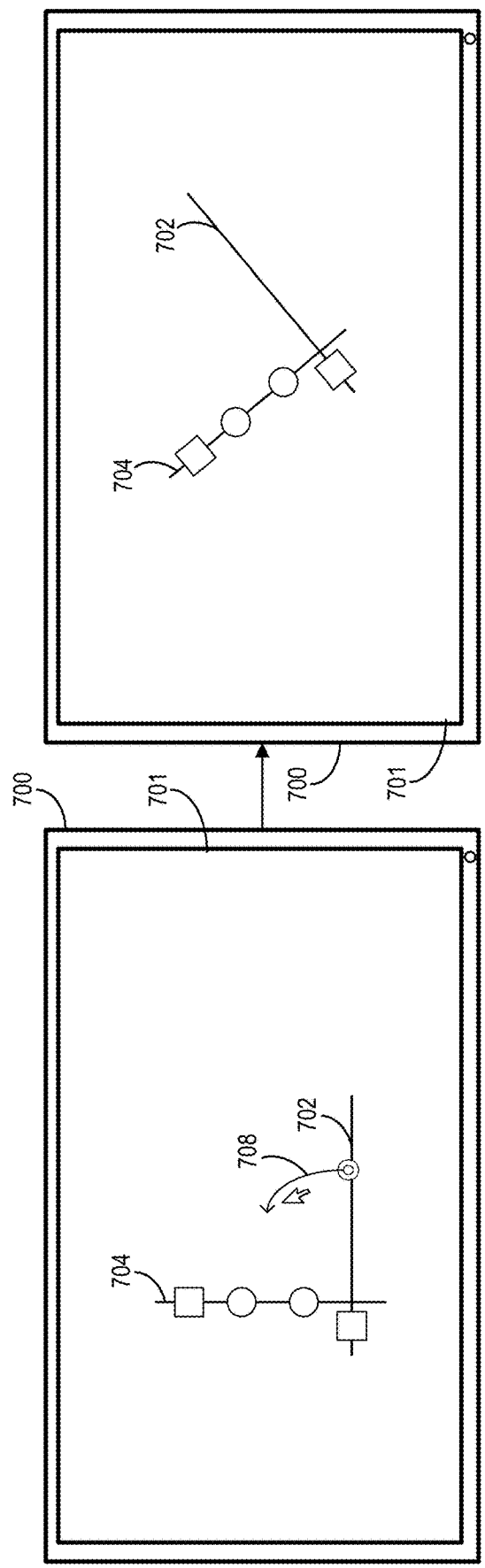
Figure 7C:
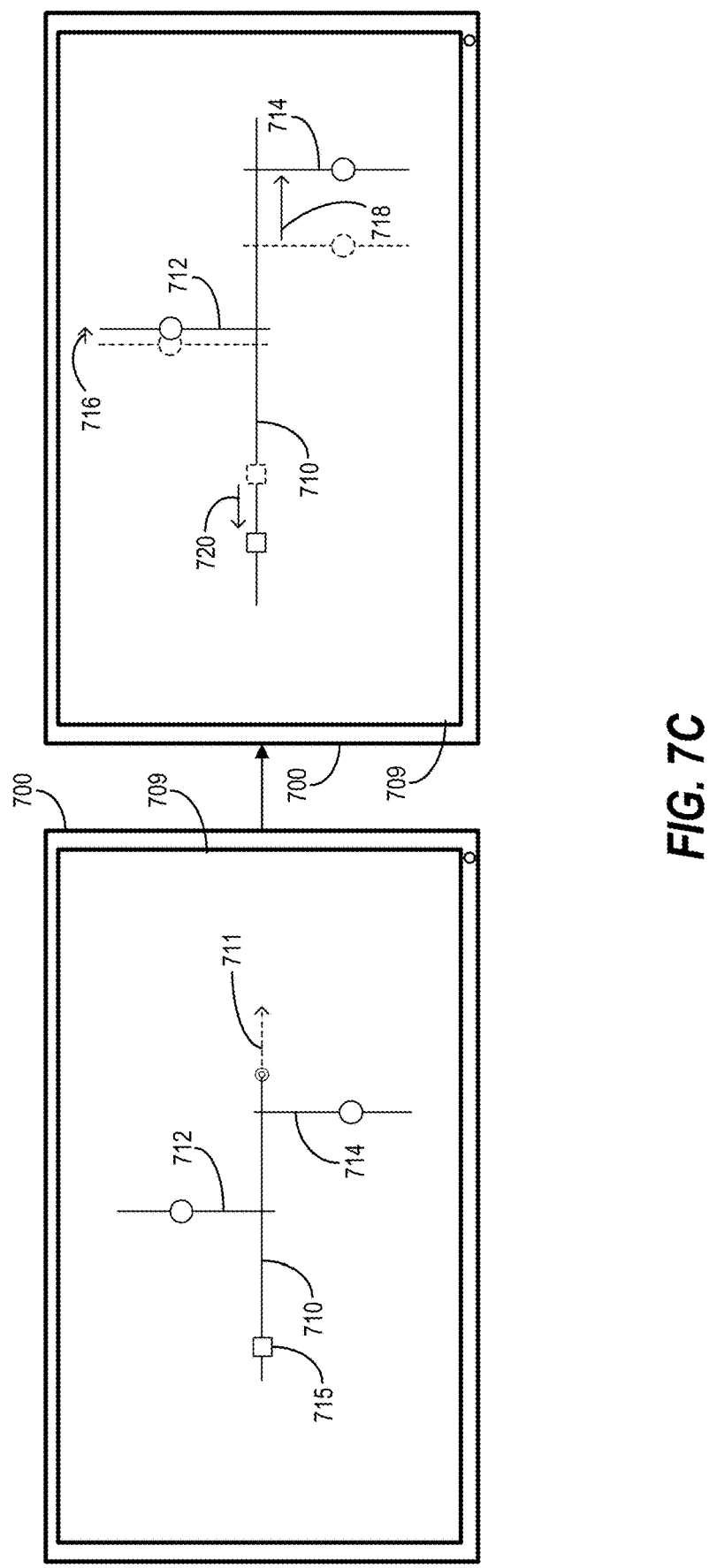

FIGS. 7A-7C illustrate a translation, rotation, and scaling of intersecting visual constraint guides. In one or more embodiments, the design guide system 112 implements transformations to intersecting visual constraint guides by maintaining the distribution and alignment of attached visual constraint guides relative to a transformed visual constraint guide. To illustrate, the design guide system 112 can utilize the following computer-implemented algorithm:

```
1:    procedure GETTRANSFORM(O, M, T)
2:        T_new. rotation ← T. rotation
3:        T_new. concat(T. translation)
4:        if T has scale component then 5:        t_x ← (G_x − O_x) * (100 − s_x)/100

6:        t_y ← (G_y − O_y) * (100 − s_y)/100

7:        T_new. concat(t_x, t_y)
8:        return T_new
```

FIG. 7A illustrates a computing device 700 portraying a digital design document 701 within a user interface. More specifically, the design guide system 112 performs a translation of a first visual constraint guide 702 and a second visual constraint guide 704 in the digital design document 701. As shown in FIG. 7A, the design guide system 112 receives a user input 706 at the second visual constraint guide 704. The design guide system 112 can receive and interpret the user input 706 to identify a translation of the second visual constraint guide 704. Based on the intersection between the first visual constraint guide 702 and the second visual constraint guide 704, the design guide system 112 translates the first visual constraint guide 702 and the second visual constraint guide 704 utilizing the same parameters. Thus, as shown in FIG. 7A, after translation, the first visual constraint guide 702 has the same orientation and alignment relative to the second visual constraint guide 704.

In one or more embodiments, where $\Theta_M$ represents a set of visual constraint guide attached to (e.g., intersecting) a visual constraint guide M and $\Sigma_M$ represents a set of digital design objects attached to the visual constraint guide M, with a transformation matrix T, and an attached visual constraint guide $M_i$ the design guide system 112 can determine transformations for attached magnetic guides using the following computer-implemented algorithm:

```
1:    procedure TRANSFORM(M,T)
2:        if M_i. flag == true then
3:            return
4:        for each o_i in Σ_M do
5:            T_new ← GETTRANSFORM(o_i ,M,T)
6:            apply T_new on o_i
7:        for each M_i in Θ_M do
8:            M_i. flag ← true
9:            T_new ← GETTRANSFORM(M_i ,M,T)
10:           apply T_new on M_i
11:           TRANSFORMOBJECT(M_i,T_new)
```

FIG. 7B illustrates a rotation of the first visual constraint guide 702 and the second visual constraint guide 704 in the digital design document 701. More specifically, the design guide system 112 receives an indication of a user input 708 at the first visual constraint guide 702. Accordingly, the design guide system 112 rotates both the first visual constraint guide 702 and the second visual constraint guide 704 around the hinge point (e.g. the center point) of the first visual constraint guide 702.

More specifically, the design guide system 112 rotates the first visual constraint guide 702 around its hinge point. Further, the design guide system 112 rotates each of the digital design objects attached to (e.g., intersecting) the first visual constraint guide around the hinge point of the first visual constraint guide 702. Additionally, the design guide system 112 rotates the second visual constraint guide 704 and each of the digital design objects attached to the second visual constraint guide 704 are also rotated around the hinge point of the first visual constraint guide 702.

Accordingly, the design guide system 112 applies the rotation based on a single user input so that (1) the digital design objects attached to the first visual constraint guide 702 maintain distribution and alignment relative to the first visual constraint guide 702, (2) the second visual constraint guide 704 maintains distribution and alignment relative to the second the first visual constraint guide 702, and (3) the digital design objects attached to the second visual constraint guide 704 maintain distribution and alignment relative to the second visual constraint guide 704. Further, the design guide system 112 ensures that the distribution and alignment of the system based on attachments between the visual constraint guides and digital design objects. To reiterate, the design guide system 112 can apply this rotation based on a single input without the need to select each affected visual constraint guide and/or digital design object.

FIG. 7C illustrates the design guide system 112 performing a scaling utilizing intersecting visual constraint guides in a digital design document 709. More specifically, FIG. 7C illustrates a visual constraint guide 710, additional visual constraint guides 712, 714, and a digital design object 715. The additional visual constraint guides 712, 714 and the digital design object 715 each intersect the visual constraint guide 710. The design guide system 112 receives a user input 711 at the visual constraint guide 710. Based on the user input 711, the visual constraint guide identifies a horizontal upscaling of the visual constraint guide 710.

As discussed above with regard to FIG. 5, the design guide system 112 can determine a transformed position along the visual constraint guide 710 for the attached digital design object 715 while maintaining the distribution and alignment relative to the visual constraint guide 710. Further, the design guide system 112 can treat the additional visual constraint guides 712, 714 as digital design objects in the scaling of the visual constraint guide 710. More specifically, the design guide system 112 can determine updated positions for the additional visual constraint guides 712, 714 based on a horizontal scaling factor and a vertical scaling factor corresponding to the scaling. More specifically, in one or more embodiments, the design guide system 112 determines a difference between the center coordinates of a visual constraint guide and the center coordinates of an attached digital design object. Further, the design guide system 112 can determine an updated position for the digital design object by multiplying the determined difference by a scaling factor expressed as a directional percentage change. In some embodiments, the design guide system 112 determines both a horizontal and a vertical change utilizing this multiplication.

Similarly to the scaling discussed above with regard to FIG. 5, where dx represents a horizontal change, dy represents a vertical change, $(M_x, M_y)$ represents the center coordinates of a visual constraint guide, $(M_{xi}, M_{yi})$ represents the center coordinates of an additional visual constraint guide, $s_x$ represents a horizontal scaling factor, and $s_y$ represents a vertical scaling factor, the design guide system 112 can determine updated positions for the additional visual constraint guide $M_i$ utilizing:

$$dx_i = \left((M_x - M_{xi}) * \frac{100 - s_x}{100}\right) \quad (3)$$

$$dy_i = \left((M_y - M_{yi}) * \frac{100 - s_y}{100}\right) \quad (4)$$

For example, take a visual constraint guide with a y scaling factor of 100% and an x scaling factor of 300% for a particular transformation. In this example, further take $(M_y-M_{yi})$ as ly, and $(M_x-M_{xi})$ as lx. In this example, the design guide system 112 can determine dy=(ly)*((100%−100%)/100)=0 1 in they direction, or no change. Further, in this example, the design guide system 112 can determine dx=(lx)*((100%−300%)/100)=−2lx. Accordingly, the design guide system 112 can move the additional visual constraint guide −2lx horizontally to maintain the relative distribution of the additional visual constraint guide along the visual constraint.

As shown in FIG. 7C, the design guide system 112 can determine and apply a scaling position change 716 corresponding to the additional visual constraint guide 712 and a scaling position change 718 corresponding to the additional visual constraint guide 714. In some embodiments, the design guide system 112 can determine the position changes for the additional visual constraint guides 714, 716 as dx and dy from Function 3 and Function 4 above. Further, the design guide system 112 can transfer the scaling position change 716 of the additional visual constraint guide 712 to each of the digital design objects intersecting the additional visual constraint guide 712. Similarly, the design guide system 112 can transfer the scaling position change 718 of the additional visual constraint guide 714 to each of the digital design objects intersecting the additional visual constraint guide 714.

Further, as shown in FIG. 7C, the design guide system 112 can apply a scaling position change 720 corresponding to the digital design object 715. The design guide system 112 can determine the position change for the digital design object 715 utilizing Function 1 and Function 2 above. Accordingly, the design guide system 112 can transform both digital design objects and visual constraint guides intersecting a transformed visual constraint guide based on a single user input.

Thus, the scaling of the visual constraint guide 710 results in maintaining the alignment and distribution of (1) the additional visual constraint guides 712, 714 and (2) the digital design object 715 intersecting the visual constraint guide 710 relative to the visual constraint guide 710. Further, the scaling results in maintaining the alignment and distribution of the additional set of digital design objects attached to the additional visual constraint guide 712 relative to the additional visual constraint guide 712 and the additional digital design objects attached to the additional visual constraint guide 714 relative to the additional visual constraint guide 712. Accordingly, each of the digital design objects intersecting any of the visual constraint guide 710 and/or the additional visual constraint guides 712, 714 maintain alignment and distribution constraints relative to the visual constraint guide 710.

Though FIGS. 7A-7C utilizes linear visual constraint guides, it will be appreciated that the design guide system 112 can dynamically utilize and update related visual constraint guides of a variety of shapes and/or types. For example, in some embodiments, the design guide system 112 can utilize relationships between a non-linear, non-circular visual constraint guides intersecting another non-linear, non-circular visual constraint guide. Accordingly, the design guide system 112 can transform (e.g., redistribute, translate, and/or re-orient) intersecting visual constraint guides whether, linear, circular, or non-linear and non-circular.

Further, though FIGS. 7A-7C illustrate particular transformations to particular visual constraint guides, it will be appreciated that the design guide system 112 can receive and implement a variety of transformations utilizing related visual constraint guides. For example, the design guide system 112 can receive and implement shape modifications, as described above with regard to FIG. 6. The design guide system 112 can transform visual constraint guides intersecting a transformed visual constraint guide as digital design objects in response to a shape modification to the transformed visual constraint guide.

Additionally, though FIGS. 7A-7C illustrate one or two connected visual constraint guides, the design guide system 112 can propagate changes through any number of intersecting guides. For example, the design guide system 112 can propagate changes from a visual constraint guide to a variety of intersecting additional visual constraint guides. Further, the design guide system 112 can propagate additional changes to visual constraint guides through a variety of connections. For example, the design guide system 112 can receive a transformation at a first visual constraint guide intersecting a second visual constraint guide, which intersects a third visual constraint guide, and so on. The design guide system 112 can propagate a transformation through each connected visual constraint guide, even visual constraint guides not directly related to the visual constraint guide that received user input indicating a transformation.

Figure 8:
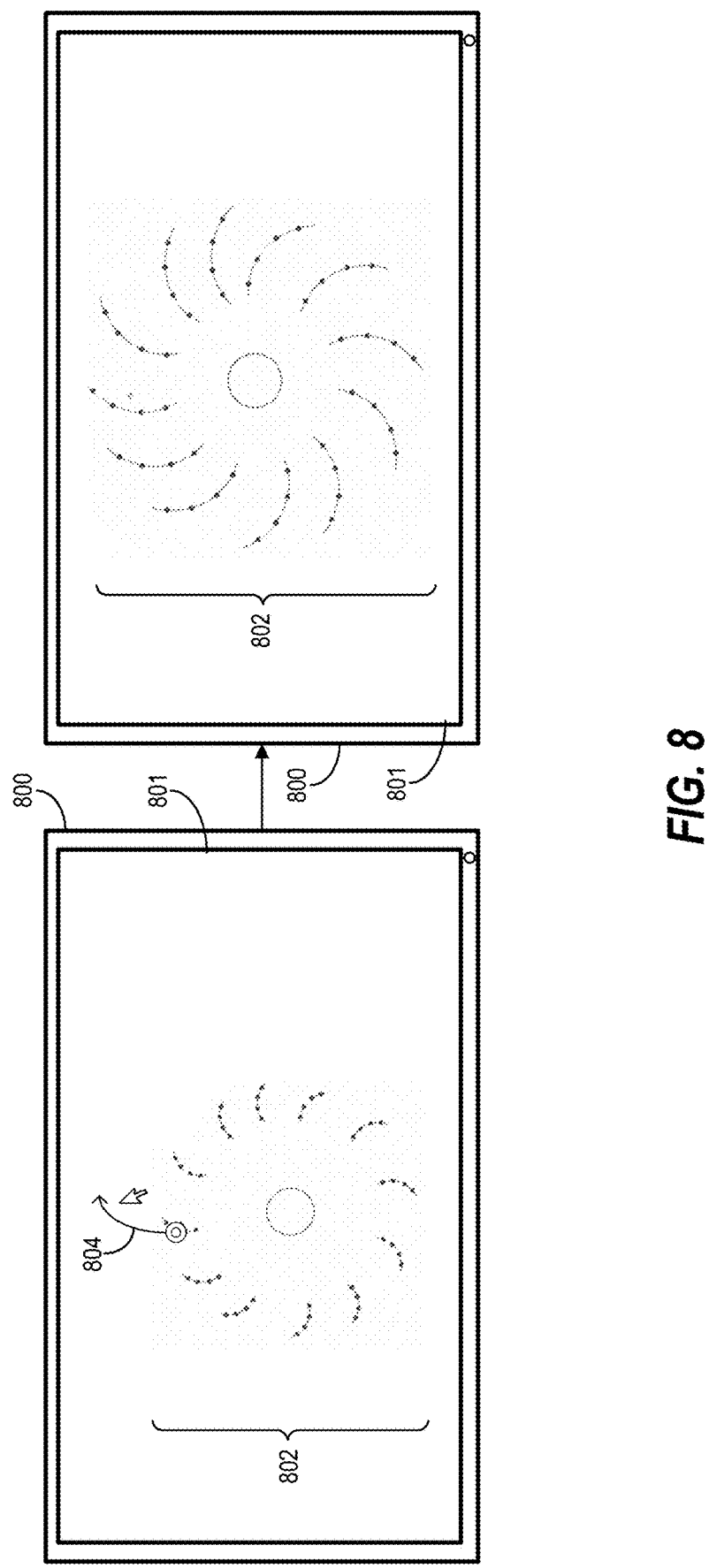
FIG. 8 illustrates a diagram of performing a transformation utilizing similar visual constraint guides in accordance with one or more embodiments.

In addition to transforming visual constraint guides based on intersections and/or attachments between visual constraint guides, the design guide system 112 can identify and utilize relationships between visual constraint guides based on similarities. FIG. 8 illustrates applying a transformation to each of a set of similar visual constraint guides in accordance with one or more embodiments.

For example, FIG. 8 illustrates a computing device 800 including a digital design document 801 that includes a set of similar visual constraint guides 802. The design guide system 112 can utilize a geometric similarity model to determine likeness between visual constraint guides. More specifically, the design guide system 112 can utilize a geometric similarity model to determine similarity metrics that quantify similarities between visual constraint guides. To illustrate, the design guide system 112 can utilize the similarity model to quantify similarity in shape, size, orientation, and other geometric characteristics among visual constraint guides.

In one or more embodiments, the design guide system 112 utilizes a Procrustes analysis to determine similarity. The design guide system 112 can utilize the Procrustes analysis to determine the distribution and relative shapes of visual constraint guides. For example, the design guide system 112 can transform and superimpose different visual constraint guides (through Procrustes superimposition) to determine similarity metrics (e.g., the Procrustes distance) of the different visual constraint guides. The design guide system 112 can utilize a variety of similarity models, including a geometric similarity model based on geometric matching or pattern matching.

Further, the design guide system 112 can compare similarity metrics with a similarity threshold to determine whether two visual constraint guides are similar enough for association in a digital design document. For example, the design guide system 112 determines that the similar visual constraint guides 802 satisfy the similarity metric despite differences in the orientations of the similar visual constraint guides 802. The design guide system 112 can utilize a default similarity threshold or a similarity threshold received via user input.

Based on determining that two visual constraint guides satisfy the similarity threshold with regard to one another, the design guide system 112 can track and record the similarity for use in applying transformations. In some embodiments, the design guide system 112 applies the same transformation to each similar visual constraint guide relative to each visual constraint guide itself. Accordingly, the design guide system 112 maintains the alignment and distribution of digital design objects relative to their connected visual constraint guides.

To illustrate, based on receiving user input 804 scaling one of the similar visual constraint guides 802, the design guide system 112 transforms the selected visual constraint guide and each of the similar visual constraint guides 802. Accordingly, the design guide system 112 can transform each of the similar visual constraint guides 802 in a constrained manner based on a single user input. More specifically, where M, $G_i$, A, and B represent visual constraint guides, and where T represents a transformation applied on M, the design guide system 112 can apply similar guide transformations utilizing the following computer-implemented algorithm:

```
Require: guide art M in transformation
Require: transformation T applied on M
   1:    procedure SIMILAR(A,B)
   2:        apply procrustes analysis [2]between A,B, to check for similarity
   3:    procedure SIMILARTRANSFORM(M,T)
   4:        if workflow in similar guide transformation mode then
   5:            for each magnetic guide G_i present in the current design do
   6:                if SIMILAR(G_i,M) then
   7:                    add G_i in L
   8:            for each M_i in List L do
   9:                TRANSFORM(M_i,T)
```

In addition or in the alternative to transforming similar visual constraint guides relative to themselves, the design guide system 112 can transform similar visual constraint guides relative to the transformed visual constraint guide. To illustrate, the design guide system 112 can transform the similar visual guides such that the similar visual guides maintain distribution and/or alignment relative to the visual constraint guide that received user input. In one or more embodiments, the design guide system 112 can transform similar visual constraint guides relative to different points based on the received user input.

In some embodiments, the design guide system 112 can determine whether to transform similar visual constraint guides based on a selectable option. For example, the design guide system 112 can provide a similar transformation toggle that can turn on and off automatic transference of transformations to similar visual constraint guides. That is, if the similar transformation setting is set to "On," the design guide system 112 can determine to transfer visual constraint guides based on a transformation received at a similar visual constraint guide. However, if the similar transformation setting is set to "Off," the design guide system 112 can determine not to transfer visual constraint guides based on a transformation received at a similar visual constraint guide.

Though FIG. 8 illustrates scaling of curved visual constraint guides, it will be appreciated that the design guide system 112 can perform a variety of transformations on a variety of visual constraint guides. More specifically, the design guide system 112 can perform rotations, translations, scaling, and/or shape modifications to similar visual constraint guides based on a single received user input.

Figure 9A:
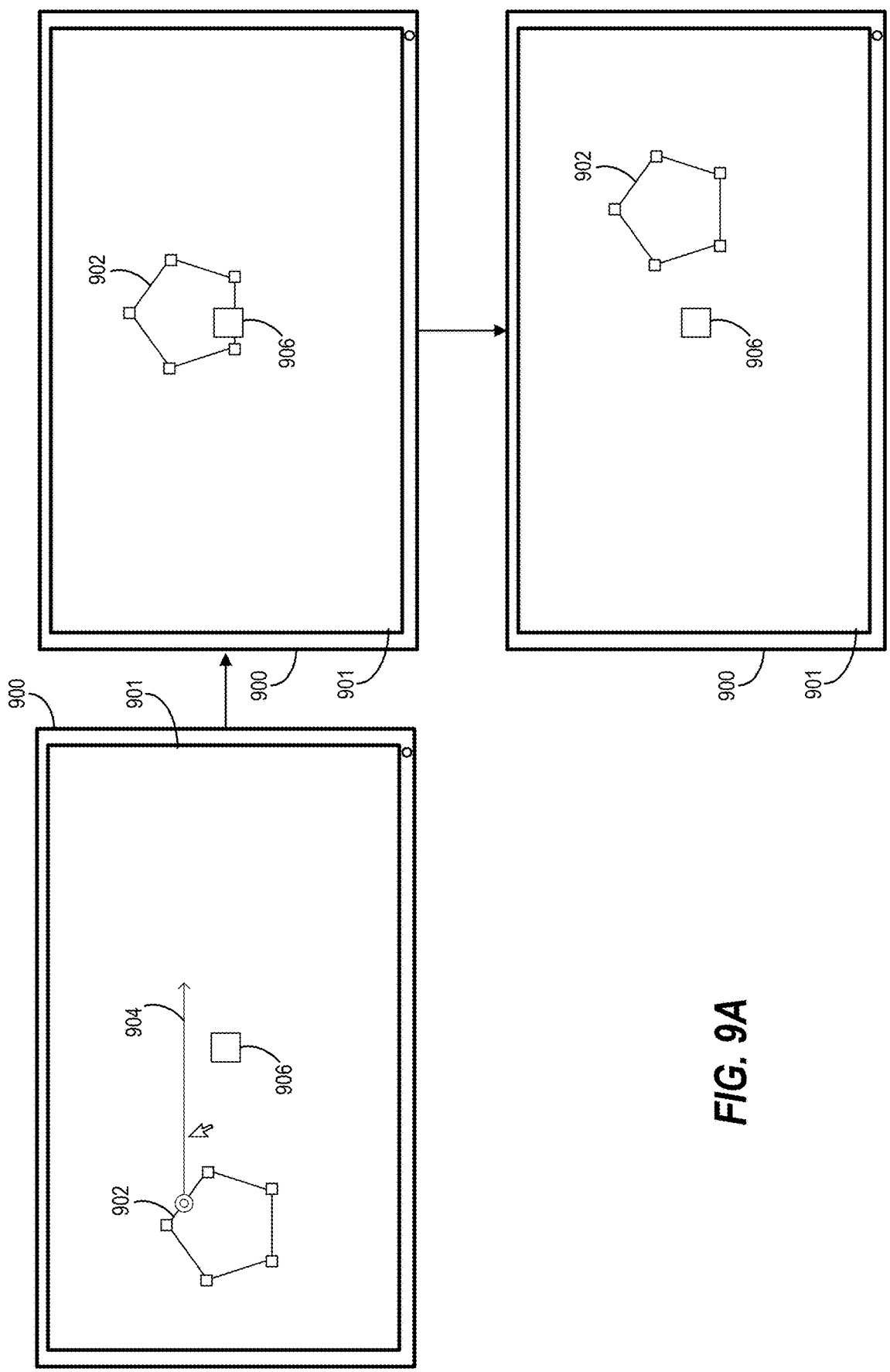
FIGS. 9A-9B illustrate diagrams of modifying visual constraint guide functionality utilizing different visual constraint guide settings in accordance with one or more embodiments.

As discussed briefly above, the design guide system 112 can dynamically alter interactions between visual constraint guides and digital design objects in a digital design document based on selectable user options. For example, the design guide system 112 can implement a toggle-able attraction mode and guide association mode. FIG. 9A illustrates a computing device 900 including a digital design document 901. More specifically, FIG. 9A illustrates the design guide system 112 performing an example translation of a visual constraint guide 902 within the digital design document 901 with an attraction mode switched off.

As discussed above, in one or more embodiments, the design guide system 112 can attach visual constraint guides to digital design objects in response to detecting an intersection formed at any time between a visual constraint guide and a digital design object. However, in some contexts, efficient work may require that a visual constraint guide cease to attach further digital design objects intersecting it. Accordingly, based on a user selection turning off an attraction mode, the design guide system 112 can decline to form new associations for visual constraint guides. To illustrate, the visual constraint guides can decline to attach digital design objects to visual constraint guides and visual constraint guides to other visual constraint guides.

As shown in FIG. 9A, the design guide system 112 receives user input 904 indicating a translation of the visual constraint guide 902. The path of the visual constraint guide 902 moves through a digital design object 906. However, due to an "Off" status of the attachment mode, the design guide system 112 performs the translation without attaching the digital design object. In other words, even though the visual constraint guide 902 now intersects the digital design object 906, the design guide system 112 does not add the digital design object 906 to a set of intersecting digital design objects that will be modified with the visual constraint guide 902. The design guide system 112 can toggle the attachment mode on and off to improve efficiency and accuracy of adding and transforming digital design objects in relation to visual constraint guides.

Figure 9B:
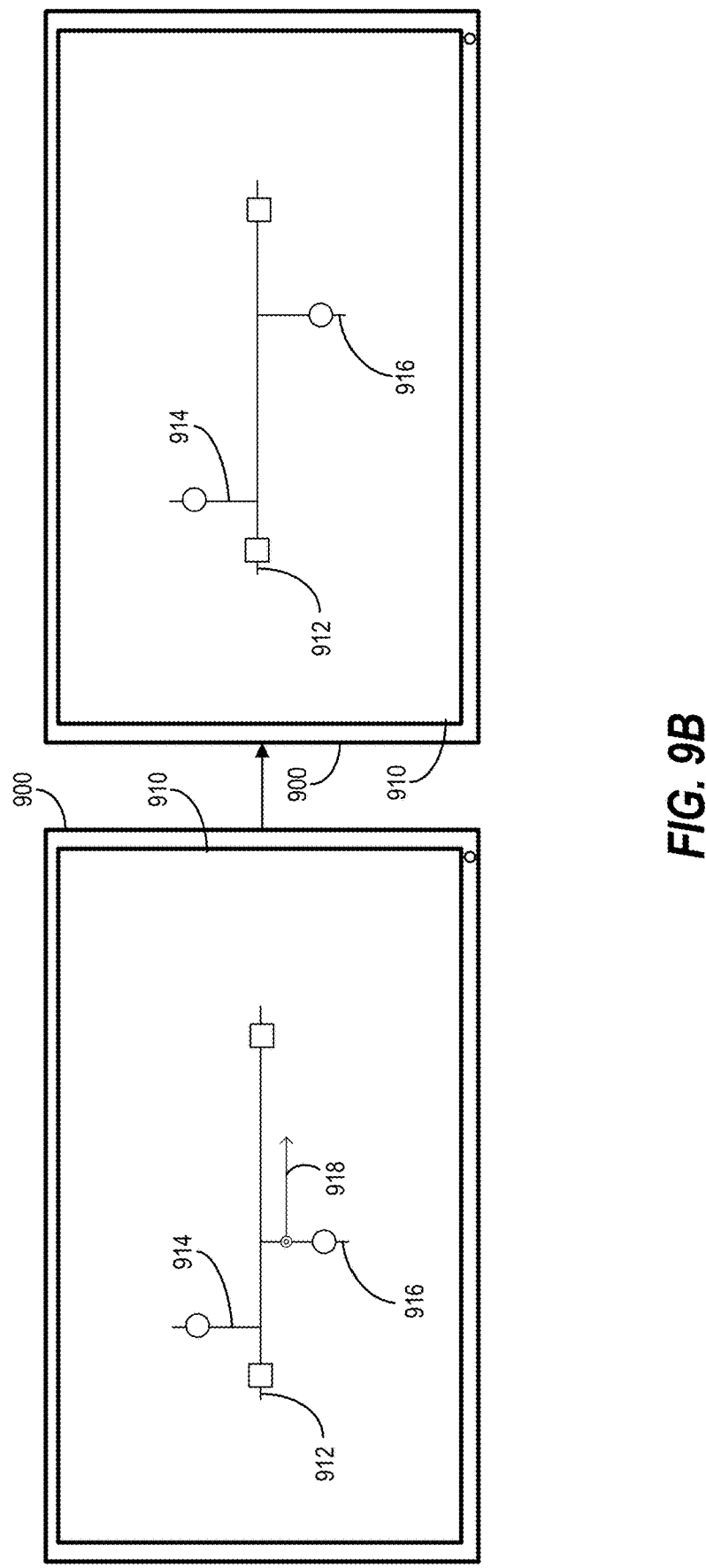

The design guide system 112 can also provide a guide association mode that controls whether intersecting visual constraint guides are considered to be attached. The design guide system 112 can provide a selectable option corresponding to the guide association mode. Further, the design guide system 112 can receive user input at that selectable option to determine whether to treat intersecting visual constraint guides as attached to another visual constraint guide. FIG. 9B illustrates the design guide system 112 applying a translation within a digital design document 910 with the guide association mode turned off.

As shown in FIG. 9B, a digital design document includes a connected visual constraint guide 912 intersecting a visual constraint guide 914 and an intersecting visual constraint guide 916. As also illustrated in FIG. 9B, the design guide system 112 receives an indication of user input 918 at the transformed visual constraint guide 916 indicating a translation to the transformed visual constraint guide 916. The design guide system 112 determines that the association mode is off, and as a result the design guide system 112 translates the transformed visual constraint guide 916 without performing any modification to the connected visual constraint guide 912, despite the intersection between the transformed visual constraint guide 916 and the connected visual constraint guide. Accordingly, the design guide system 112 can control application of translations to intersecting visual constraint guides utilizing the guide association mode.

Figure 10:
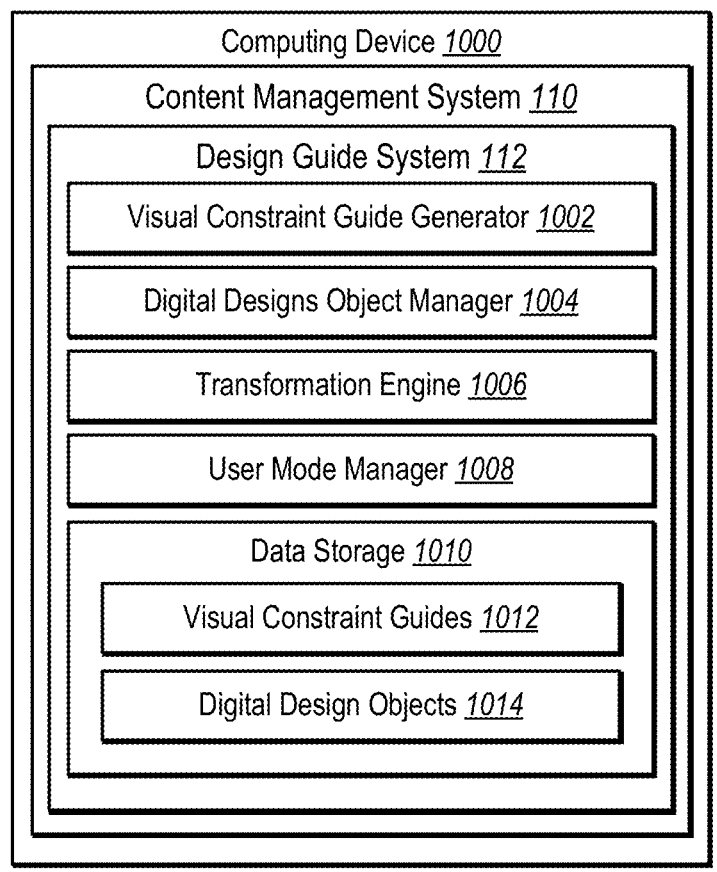
FIG. 10 illustrates a schematic diagram of a design guide system in accordance with one or more embodiments.

Turning now to FIG. 10, this figure provides additional detail regarding components and features of a contextual translation system. In particular, FIG. 10 illustrates a computing device 1000 implementing the content management system 110 and the design guide system 112. The computing device 1000 can include one or more servers (e.g., the server device(s) 108) and/or one or more client devices (e.g., the client device 102). As shown in FIG. 10, the computing device 1000 includes a visual constraint guide generator 1002, a digital design objects manager 1004, a transformation engine 1006, a user mode manager 1008, and a data storage 1010.

As shown in FIG. 10, the computing device 1000 includes the visual constraint guide generator 1002. The visual constraint guide generator 1002 can generate visual constraint guides based on a variety of user input. For example, the visual constraint guide generator 1002 can generate visual constraint guides based on user selection of a shape and/or size of the visual constraint guide. Further, the visual constraint guide can automatically generate a visual constraint guide for a set of selected digital design objects utilizing cost metrics. The visual constraint guide generator 1002 can determine and utilize relationships between visual constraint guides.

As also shown in FIG. 10, the computing device 1000 includes the digital design objects manager 1004. The digital design objects manager 1004 can determine and manage the inclusion and/or correspondence of digital design objects to visual constraint guides. For example, the digital design objects manager 1004 can monitor and determine whether digital design objects intersect visual constraint guides. Accordingly, the digital design objects manager 1004 can determine whether to apply transformations received at a visual constraint guide to a given digital design object.

Further, as shown in FIG. 10, the computing device 1000 includes the transformation engine 1006. The transformation engine 1006 can perform a variety of transformations, modifications, and edits to digital design objects and visual constraint guides in digital design documents. For example, the transformation engine 1006 can apply translations, rotations, scaling, and/or shape modifications to visual constraint guides and associated digital design objects. More specifically, based on receiving an indication of a transformation to a visual constraint guide, the transformation engine 1006 can apply the transformation to the visual constraint guide. Further, the transformation engine 1006 can apply the transformation to digital design objects included in the visual constraint guide while maintaining the distribution and alignment of the digital design objects relative to the visual constraint guide.

Additionally, as shown in FIG. 10, the computing device 1000 includes the user mode manager 1008. The user mode manager 1008 can monitor and implement different user modes that modify interactions among visual constraint guides and/or digital design objects. For example, the user mode manager 1008 can manage and implement changes based on an attachment mode. Additionally, the user mode manager 1008 can manage and implement changes based on an association mode.

Also, as shown in FIG. 10, the computing device 1000 includes the data storage 1010. The data storage 1010 accesses and stores files, indicators, and other data for the design guide system 112. For example, as shown in FIG. 10, the data storage 1010 includes visual constraint guides 1012 and digital design objects 1014.

Each of the components 1002-1010 of the design guide system 112 can include software, hardware, or both. For example, the components 1002-1010 can include one or more instructions stored on a computer-readable storage medium and executable by processors of one or more computing devices, such as a client device or server device. When executed by the one or more processors, the computer-executable instructions of the design guide system 112 can cause the computing device(s) to perform the methods described herein. Alternatively, the components 1002-1010 can include hardware, such as a special-purpose processing device to perform a certain function or group of functions. Alternatively, the components 1002-1010 of the design guide system 112 can include a combination of computer-executable instructions and hardware.

Furthermore, the components 1002-1010 of the design guide system 112 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1010 may be implemented as a stand-alone application, such as a desktop or mobile application. Furthermore, the components 1002-1010 may be implemented as one or more web-based applications hosted on a remote server. The components 1002-1010 may also be implemented in a suite of mobile device applications or "apps." To illustrate, the components 1002-1010 may be implemented in an application, including but not limited to ADOBE PHOTOSHOP, ADOBE ILLUSTRATOR, ADOBE PREMIERE PRO, AND ADOBE CREATIVE CLOUD. "ADOBE", "ADOBE PHOTOSHOP," "ADOBE ILLUSTRATOR," "ADOBE PREMIERE PRO," AND "ADOBE CREATIVE CLOUD" are either registered trademarks or trademarks of Adobe Inc. in the United States and/or other countries.

Figure 11:
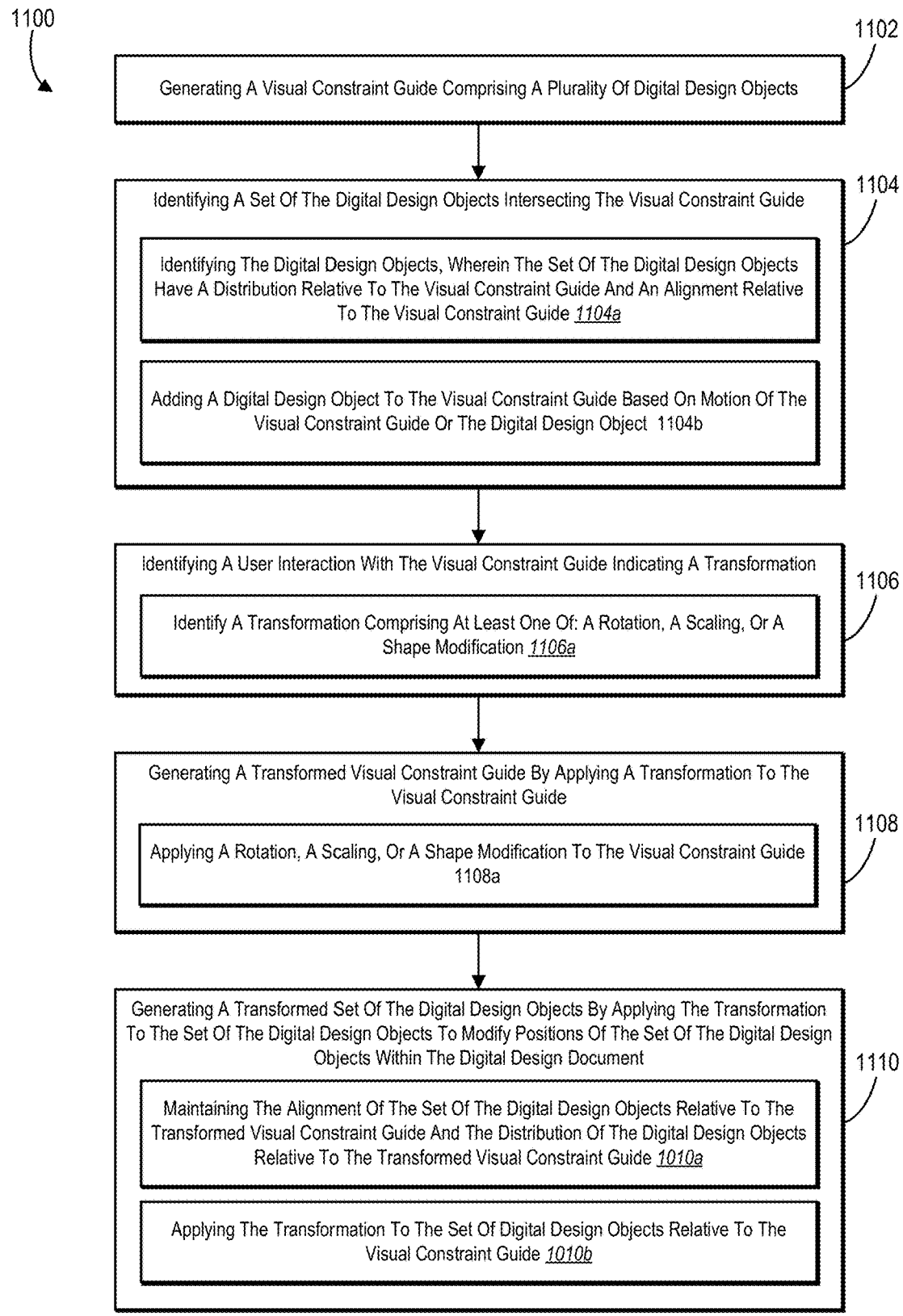
FIG. 11 illustrates a flowchart of a series of acts for transforming a visual constraint guide and corresponding digital design objects in accordance with one or more embodiments.

FIGS. 1-10, the corresponding text, and the examples provide a number of different methods, systems, devices, and non-transitory computer-readable media of the design guide system 112. In addition to the foregoing, one or more embodiments can also be described in terms of flowcharts comprising acts for accomplishing a particular result, as shown in FIG. 11. FIG. 11 may be performed with more or fewer acts. Further, the acts may be performed in differing orders. Additionally, the acts described herein may be repeated or performed in parallel with one another or parallel with different instances of the same or similar acts.

As mentioned, FIG. 11 illustrates a flowchart of a series of acts 1100 for generating a transformed visual constraint guide and corresponding digital design objects in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown in FIG. 11, the series of acts 1100 includes an act 1102 for generating a visual constraint guide comprising a plurality of digital design objects. In particular, the act 1102 can include generating a visual constraint guide within a digital design document comprising a plurality of digital design objects. Specifically, the act 1102 can include automatically generating the visual constraint guide by: determining deflection angles between digital design objects from the set of the digital design objects, determining geometric distances between the digital design objects from the set of the digital design objects, and analyzing the deflection angles and the geometric distances to connect the digital design objects from the set of the digital design objects and generate the visual constraint guide.

Additionally, as shown in FIG. 11, the series of acts 1100 includes an act 1104 for identifying a set of the digital design objects intersecting the visual constraint guide. As further indicated by FIG. 11, the act 1104 can include (i) identifying the digital design objects, wherein the set of the digital design objects have a distribution relative to the visual constraint guide and an alignment relative to the visual constraint guide and (ii) adding a digital design object to the visual constraint guide based on motion of the visual constraint guide or the digital design object. Specifically, the act 1104 can include generating the visual constraint guide by combining the deflection angles and the geometric distances to determine cost metrics for connections between the digital design objects from the set of the digital design objects, utilizing the cost metrics to select a subset of the connections between the digital design objects from the set of the digital design objects, and generating the visual constraint guide by combining the subset of the connections. The act 1104 can also include wherein the visual constraint guide comprises a non-linear and non-circular geometric shape.

Further, as shown in FIG. 11, the series of acts 1100 includes an act 1106 for identifying a user interaction with the visual constraint guide indicating a transformation. In particular, the act 1106 can include identifying a user interaction with the visual constraint guide indicating a transformation comprising at least one of: a rotation, a scaling, or a shape modification. As further indicated by FIG. 11, the act 1106 can include identifying a transformation comprising at least one of: a rotation, a scaling, or a shape modification.

Further, as shown in FIG. 11, the series of acts 1100 includes an act 1108 for generating a transformed visual constraint guide by applying a transformation to the visual constraint. In particular, the act 1108 can include in response to user interaction with the visual constraint guide generating a transformed visual constraint guide by applying a transformation to the visual constraint guide, the transformation comprising at least one of: a rotation, a scaling, or a shape modification. As further indicated by FIG. 11, the act 1108 can include applying a rotation, a scaling, or a shape modification to the visual constraint guide.

Further, as shown in FIG. 11, the series of acts 1100 includes an act 1110 for generating a transformed set of the digital design objects by applying the transformation to the set of the digital design objects to modify positions of the set of the digital design objects within the digital design document. In particular, the act 1110 can include in response to user interaction with the visual constraint guide, generating a transformed set of the digital design objects by applying the transformation to the set of the digital design objects intersecting the visual constraint guide to modify positions of the set of the digital design objects within the digital design document. As further indicated by FIG. 11, the act 1110 can include (i) maintaining the alignment of the set of the digital design objects relative to the transformed visual constraint guide and the distribution of the digital design objects relative to the transformed visual constraint guide, and (ii) applying the transformation to the set of digital design objects relative to the visual constraint guide.

Specifically, the act 1110 can include, wherein the transformation comprises a shape modification of the non-linear and non-circular geometric shape, generating the transformed set of the digital design objects by mapping the visual constraint guide to a first linear path and the set of the digital design objects to positions along the first linear path, mapping the transformed visual constraint guide to a second linear path, comparing the first linear path and the second linear path to determine a scaling factor, applying the scaling factor to the positions of the set of the digital design objects along the first linear path to determine transformed positions of the set of the digital design objects along the second linear path, and mapping the transformed positions of the set of the digital design objects from the second linear path to the transformed visual constraint guide.

Further, the act 1110 can include generating an additional visual constraint guide within the digital design document, identifying an additional set of the digital design objects intersecting the additional visual constraint guide, and generating an additional transformed visual constraint guide and an additional transformed set of the digital design objects in response to the user interaction with the visual constraint guide. The act 1110 can also include generating the additional transformed visual constraint guide and the additional transformed set of the digital design objects by applying the transformation to the additional visual constraint guide, and applying the transformation to the additional set of the digital design objects intersecting the additional visual constraint guide to modify positions of the additional set of the digital design objects within the digital design document relative to the additional visual constraint guide.

Additionally, the act 1110 can include analyzing the visual constraint guide and the additional visual constraint guide utilizing a geometric similarity model to determine that the visual constraint guide and the additional visual constraint guide satisfy a similarity threshold, and applying the transformation to the additional visual constraint guide and the additional set of the digital design objects intersecting the additional visual constraint guide based on determining that the visual constraint guide and the additional visual constraint guide satisfy the similarity threshold. Also, the act 1110 can include identifying an intersection between the visual constraint guide and the additional visual constraint guide and applying the transformation to the additional visual constraint guide and the additional set of the digital design objects intersecting the additional visual constraint guide based on the intersection between the visual constraint guide and the additional visual constraint guide.

Further, the act 1110 can include applying the scaling to the set of the digital design objects while maintaining the distribution of the digital design objects relative to the transformed visual constraint guide by identifying a scaling factor between the visual constraint guide and the transformed visual constraint guide, determining a geometric center of the visual constraint guide and a geometric center of a digital design object of the set of the digital design objects, determining a difference between the geometric center of the visual constraint guide and the geometric center of the digital design object, and generating the transformed digital design object utilizing the difference and the scaling factor. The act 1110 can also include apply the scaling to the set of the digital design objects while maintaining the distribution of the digital design objects relative to the transformed visual constraint guide by generating a scaling position change by applying the scaling factor to the difference between the center of the visual constraint guide and the center of the set of the digital design objects, and applying the scaling position change to an initial position of the digital design object to generate the transformed digital design object.

Additionally, the act 1110 can include applying the rotation while maintaining the alignment of the set of the digital design objects relative to the transformed visual constraint guide by identifying a hinge point corresponding to the visual constraint guide and a rotation angle around the hinge point based on the user interaction, and rotating the visual constraint guide and the set of the digital design objects around the hinge point. Also, the act 1110 can include wherein the transformation comprises the rotation, and applying the transformation to the additional visual constraint guide comprises rotating the additional visual constraint guide around a hinge point corresponding to the visual constraint guide and applying the transformation to the additional set of the digital design objects comprises rotating the additional set of the digital design objects around the hinge point corresponding to the visual constraint guide.

Further, the act 1110 can include wherein the transformation comprises the scaling and applying the transformation to the additional visual constraint guide comprises determining a scaling factor corresponding to the transformed visual constraint guide, determining a scaling position change of the additional visual constraint guide based on the scaling factor, and moving the additional visual constraint guide utilizing the scaling position change. The act 1110 can also include wherein applying the transformation to the additional set of the digital design objects comprises moving the additional set of the digital design objects utilizing the scaling position change.

In addition to the foregoing, the series of acts 1100 can also include performing a step for transforming the set of the digital design objects and the visual constraint guide in response to user interaction with the visual constraint guide. For instance, the algorithms and acts described in relation to FIGS. 2, 4-8 can comprise the corresponding structures, acts, or algorithms for a step for transforming the set of the digital design objects and the visual constraint guide in response to user interaction with the visual constraint guide.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

FIG. 12 illustrates a block diagram of example computing device 1200 (e.g., the server device(s) 108, the client device 102, or the computing device 1000) that may be configured to perform one or more of the processes described above. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for digitizing real-world objects, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions related to object digitizing processes (e.g., digital scans, digital models).

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example and not by way of limitation, the communication interface 1210 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer system to perform operations comprising:
   generating a visual constraint guide within a digital design document comprising digital design objects;
   identifying a set of the digital design objects intersecting the visual constraint guide; and
   in response to user interaction with the visual constraint guide:
      generating a transformed visual constraint guide by applying a transformation to the visual constraint guide, the transformation comprising a size scaling transformation; and
      generating a transformed set of the digital design objects by proportionally changing distances between the digital design objects based on the size scaling transformation to the visual constraint guide.

2. The non-transitory computer-readable medium of claim 1, further comprising instructions that, when executed by the at least one processor, cause the computer system to perform an operation comprising automatically generating the visual constraint guide by:
   determining deflection angles between digital design objects from the set of the digital design objects;
   determining geometric distances between the digital design objects from the set of the digital design objects; and
   analyzing the deflection angles and the geometric distances to connect the digital design objects from the set of the digital design objects and generate the visual constraint guide.

3. The non-transitory computer-readable medium of claim 2, wherein generating the visual constraint guide comprises:
   combining the deflection angles and the geometric distances to determine cost metrics for connections between the digital design objects from the set of the digital design objects;
   utilizing the cost metrics to select a subset of the connections between the digital design objects from the set of the digital design objects; and
   generating the visual constraint guide by combining the subset of the connections.

4. The non-transitory computer-readable medium of claim 1, wherein the visual constraint guide comprises a non-linear and non-circular geometric shape.

5. The non-transitory computer-readable medium of claim 4, wherein the transformation comprises a shape modification of the non-linear and non-circular geometric shape and wherein generating the transformed set of the digital design objects comprises:
   mapping the visual constraint guide to a first linear path and the set of the digital design objects to positions along the first linear path;
   mapping the transformed visual constraint guide to a second linear path;
   comparing the first linear path and the second linear path to determine a scaling factor;
   applying the scaling factor to the positions of the set of the digital design objects along the first linear path to determine transformed positions of the set of the digital design objects along the second linear path; and
   mapping the transformed positions of the set of the digital design objects from the second linear path to the transformed visual constraint guide.

6. The non-transitory computer-readable medium of claim 1, further comprising instructions that, when executed by the at least one processor, cause the computer system to perform operations comprising:
   generating an additional visual constraint guide within the digital design document;
   identifying an additional set of the digital design objects intersecting the additional visual constraint guide; and
   generating an additional transformed visual constraint guide and an additional transformed set of the digital design objects in response to the user interaction with the visual constraint guide.

7. The non-transitory computer-readable medium of claim 6, further comprising instructions that, when executed by the at least one processor, cause the computer system to perform an operation comprising generating the additional transformed visual constraint guide and the additional transformed set of the digital design objects by:
   applying the transformation to the additional visual constraint guide; and
   applying the transformation to the additional set of the digital design objects intersecting the additional visual constraint guide to modify positions of the additional set of the digital design objects within the digital design document relative to the additional visual constraint guide.

8. The non-transitory computer-readable medium of claim 7, further comprising instructions that, when executed by the at least one processor, cause the computer system to perform operations comprising:
   analyzing the visual constraint guide and the additional visual constraint guide utilizing a geometric similarity model to determine that the visual constraint guide and the additional visual constraint guide satisfy a similarity threshold; and
   applying the transformation to the additional visual constraint guide and the additional set of the digital design objects intersecting the additional visual constraint guide based on determining that the visual constraint guide and the additional visual constraint guide satisfy the similarity threshold.

9. The non-transitory computer-readable medium of claim 7, further comprising instructions that, when executed by the at least one processor, cause the computer system to perform operations comprising:
   identifying an intersection between the visual constraint guide and the additional visual constraint guide; and
   applying the transformation to the additional visual constraint guide and the additional set of the digital design objects intersecting the additional visual constraint guide based on the intersection between the visual constraint guide and the additional visual constraint guide.

10. A system comprising:
   one or more memory devices comprising a digital design document and digital design objects; and
   one or more computing devices that are configured to cause the system to:

generate a visual constraint guide within the digital design document comprising the digital design objects;

identify a set of the digital design objects intersecting the visual constraint guide, wherein the set of the digital design objects have a distribution relative to the visual constraint guide and an alignment relative to the visual constraint guide;

identify a first user interaction with the visual constraint guide indicating a first transformation comprising at least one of: a translation, a rotation transformation, a size scaling transformation, or a shape modification;

generate a transformed visual constraint guide by applying the first transformation to the visual constraint guide;

generate a transformed set of the digital design objects by translating the set of the digital design objects based on the translation to the visual constraint guide, positionally rotating the set of the digital design objects based on the rotation transformation to the visual constraint guide, proportionally changing distances between the digital design objects based on the size scaling transformation to the visual constraint guide, or modifying a shape configuration of the set of the digital design objects based on the shape modification to the visual constraint guide while maintaining the alignment of the set of the digital design objects relative to the transformed visual constraint guide and the distribution of the digital design objects relative to the transformed visual constraint guide;

in response to identifying an additional digital design object that intersects the transformed visual constraint guide, generate an updated set of the digital design objects by adding the additional digital design object to the transformed set of the digital design objects;

identify a second user interaction with the transformed visual constraint guide indicating a second transformation; and generate a transformed updated set of the digital design objects from the updated set of the digital design objects based on the second transformation.

11. The system of claim 10, wherein the one or more computing devices are further configured to cause the system to apply the size scaling transformation to the set of the digital design objects while maintaining the distribution of the digital design objects relative to the transformed visual constraint guide by:

identifying a scaling factor between the visual constraint guide and the transformed visual constraint guide;

determining a geometric center of the visual constraint guide and a geometric center of a digital design object of the set of the digital design objects;

determining a difference between the geometric center of the visual constraint guide and the geometric center of the digital design object; and generating a transformed digital design object utilizing the difference and the scaling factor.

12. The system of claim 11, wherein the one or more computing devices are further configured to cause the system to apply the size scaling transformation to the set of the digital design objects while maintaining the distribution of the digital design objects relative to the transformed visual constraint guide by:

generating a scaling position change by applying the scaling factor to the difference between a center of the visual constraint guide and a center of the set of the digital design objects; and applying the scaling position change to an initial position of the digital design object to generate the transformed digital design object.

13. The system of claim 10, wherein the one or more computing devices are further configured to cause the system to apply the rotation transformation while maintaining the alignment of the set of the digital design objects relative to the transformed visual constraint guide by:

identifying a hinge point corresponding to the visual constraint guide and a rotation angle around the hinge point based on the first user interaction; and rotating the visual constraint guide and the set of the digital design objects around the hinge point.

14. The system of claim 10, wherein the one or more computing devices are further configured to cause the system to:

generate an additional visual constraint guide within the digital design document;

identify an additional set of the digital design objects intersecting the additional visual constraint guide; and in response to the first user interaction with the visual constraint guide:

generate an additional transformed visual constraint guide by applying the first transformation to the additional visual constraint guide; and generate an additional transformed set of the digital design objects by applying the first transformation to the additional set of the digital design objects intersecting the additional visual constraint guide.

15. The system of claim 14, wherein:

the first transformation comprises the rotation transformation;

applying the first transformation to the additional visual constraint guide comprises rotating the additional visual constraint guide around a hinge point corresponding to the visual constraint guide; and applying the first transformation to the additional set of the digital design objects comprises rotating the additional set of the digital design objects around the hinge point corresponding to the visual constraint guide.

16. The system of claim 14, wherein:

the first transformation comprises the size scaling transformation; and applying the first transformation to the additional visual constraint guide comprises:

determining a scaling factor corresponding to the transformed visual constraint guide;

determining a scaling position change of the additional visual constraint guide based on the scaling factor; and moving the additional visual constraint guide utilizing the scaling position change.

17. The system of claim 16, wherein applying the first transformation to the additional set of the digital design objects comprises moving the additional set of the digital design objects utilizing the scaling position change.

18. A method comprising:

identifying digital design objects within a digital design document;

generating a visual constraint guide within the digital design document;

identifying a set of the digital design objects intersecting the visual constraint guide;

in response to user interaction with the visual constraint guide, transforming the set of the digital design objects and the visual constraint guide by modifying a shape configuration and corresponding orientations of a subset of the digital design objects based on a segment shape modification to a segment of the visual constraint guide; and providing the transformed set of the digital design objects and a transformed visual constraint guide for display within the digital design document.

19. The method of claim 18, wherein the visual constraint guide comprises a non-linear and non-circular geometric shape.

20. The method of claim 18 further comprising automatically generating the visual constraint guide by:
- determining deflection angles between digital design objects from the set of the digital design objects;
- determining geometric distances between the digital design objects from the set of the digital design objects;
- combining the deflection angles and the geometric distances to determine cost metrics for connections between the digital design objects from the set of the digital design objects; and
- utilizing the cost metrics to select a subset of the connections between the digital design objects from the set of the digital design objects.

* * * * *